United States Patent
Saito

(10) Patent No.: US 9,524,002 B2
(45) Date of Patent: Dec. 20, 2016

(54) ELECTRONIC DEVICE

(71) Applicant: FUJITSU LIMITED, Kawasaki-shi, Kanagawa (JP)

(72) Inventor: Akira Saito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 36 days.

(21) Appl. No.: 14/457,757

(22) Filed: Aug. 12, 2014

(65) Prior Publication Data

US 2015/0077915 A1    Mar. 19, 2015

(30) Foreign Application Priority Data

Sep. 17, 2013 (JP) ................................ 2013-192348

(51) Int. Cl.
*G06F 1/16* (2006.01)
*F16M 11/10* (2006.01)
*F16M 11/20* (2006.01)

(52) U.S. Cl.
CPC ............ *G06F 1/1601* (2013.01); *F16M 11/10* (2013.01); *F16M 11/105* (2013.01); *F16M 11/2021* (2013.01); *F16M 2200/041* (2013.01); *F16M 2200/044* (2013.01); *F16M 2200/063* (2013.01)

(58) Field of Classification Search
CPC ........ G06F 1/16; G06F 1/1637; G06F 1/1641; G06F 1/1601; H05K 5/0226; H05K 5/0234; F16M 11/10; F16M 11/021; F16M 11/2021; F16M 11/105; F16M 2200/041; F16M 2200/044; F16M 2200/063

USPC ............ 361/679.01, 679.02, 679.21, 679.26, 361/679.27, 679.22; 248/917–924
See application file for complete search history.

(56) References Cited

U.S. PATENT DOCUMENTS

| | | | | |
|---|---|---|---|---|
| 6,288,891 | B1 * | 9/2001 | Hasegawa | F16M 11/10 248/923 |
| 7,717,384 | B2 * | 5/2010 | Kim | F16M 11/04 248/284.1 |
| 2006/0022108 | A1 | 2/2006 | Kuga | |
| 2006/0187625 | A1 * | 8/2006 | Jung | G06F 1/1601 361/679.06 |
| 2006/0238966 | A1 * | 10/2006 | Sung | F16M 11/04 361/679.05 |
| 2014/0328012 | A1 * | 11/2014 | Myerchin | G06F 1/16 361/679.22 |

FOREIGN PATENT DOCUMENTS

| | | |
|---|---|---|
| JP | 5-210430 A | 8/1993 |
| JP | 11-95866 A | 4/1999 |
| JP | 2008-542654 A | 11/2008 |
| WO | 00/73024 A2 | 12/2000 |
| WO | 2004/028151 A1 | 4/2004 |
| WO | 2006/130324 A2 | 12/2006 |

* cited by examiner

*Primary Examiner* — Anthony Haughton
*Assistant Examiner* — Ingrid Wright
(74) *Attorney, Agent, or Firm* — Westerman, Hattori, Daniels & Adrian, LLP

(57) ABSTRACT

An electronic device includes an arm that pivots with respect to a body of the electronic device, a device that pivots with respect to the arm, and a link mechanism that includes a slider disposed along the arm, the link mechanism moving the slider along the arm upon pivoting of the device such that the arm pivots in a direction opposite to a pivoting direction of the device.

16 Claims, 19 Drawing Sheets

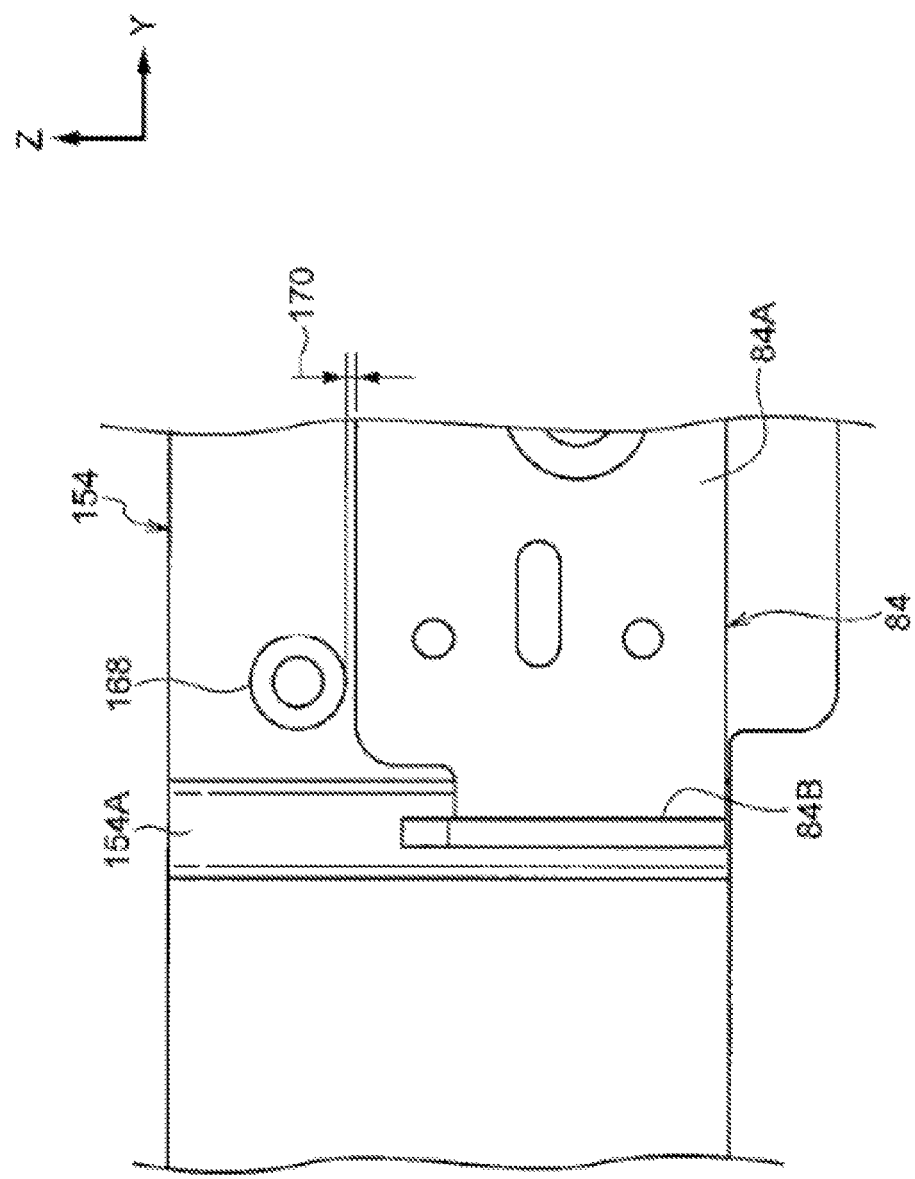

ELECTRONIC DEVICE

CROSS-REFERENCE TO RELATED APPLICATION

This application is based upon and claims the benefit of priority of the prior Japanese Patent Application No. 2013-192348, filed on Sep. 17, 2013, the entire contents of which are incorporated herein by reference.

FIELD

The embodiments discussed herein are related to an electronic device.

BACKGROUND

An electronic device includes a movable arm supported by a bracket in a pivotal manner, a display panel supported by the movable arm in a pivotal manner, and toothed belts that, upon pivoting of the movable arm, pivot the display panel in a direction opposite to a pivoting direction of the movable arm. Such a technology is described in Japanese Laid-open Patent Publication No. 11-95866, for example.

SUMMARY

According to an aspect of the invention, an electronic device includes an arm that pivots with respect to a body of the electronic device, a device that pivots with respect to the arm, and a link mechanism that includes a slider disposed along the arm, the link mechanism moving the slider along the arm upon pivoting of the device such that the arm pivots in a direction opposite to a pivoting direction of the device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a partially exploded view of FIG. 16; and

DESCRIPTION OF EMBODIMENTS

The toothed belts described above are each wound across a pivot shaft of the movable arm and a pivot shaft of the display panel via gears. Accordingly, when the diameter of each gear is large, the installation space of each toothed belt becomes large. This may result in an increase in size of the elements around the movable arm.

An aspect of the embodiments discussed herein is to provide an electronic device in which it is possible to reduce the size of the elements around the movable arm.

Hereinafter, embodiments of the technology discussed herein will be described with reference to the drawings. Note that an arrow X illustrated in each drawing as appropriate indicates a front side of an electronic device in the front-rear direction. Furthermore, an arrow Y indicates an outer side of the electronic device in the width direction. Moreover, an arrow Z indicates an upper side of the electronic device in the up-down direction.

A description of a first embodiment will be given first.

Electronic Device

Figure 1:
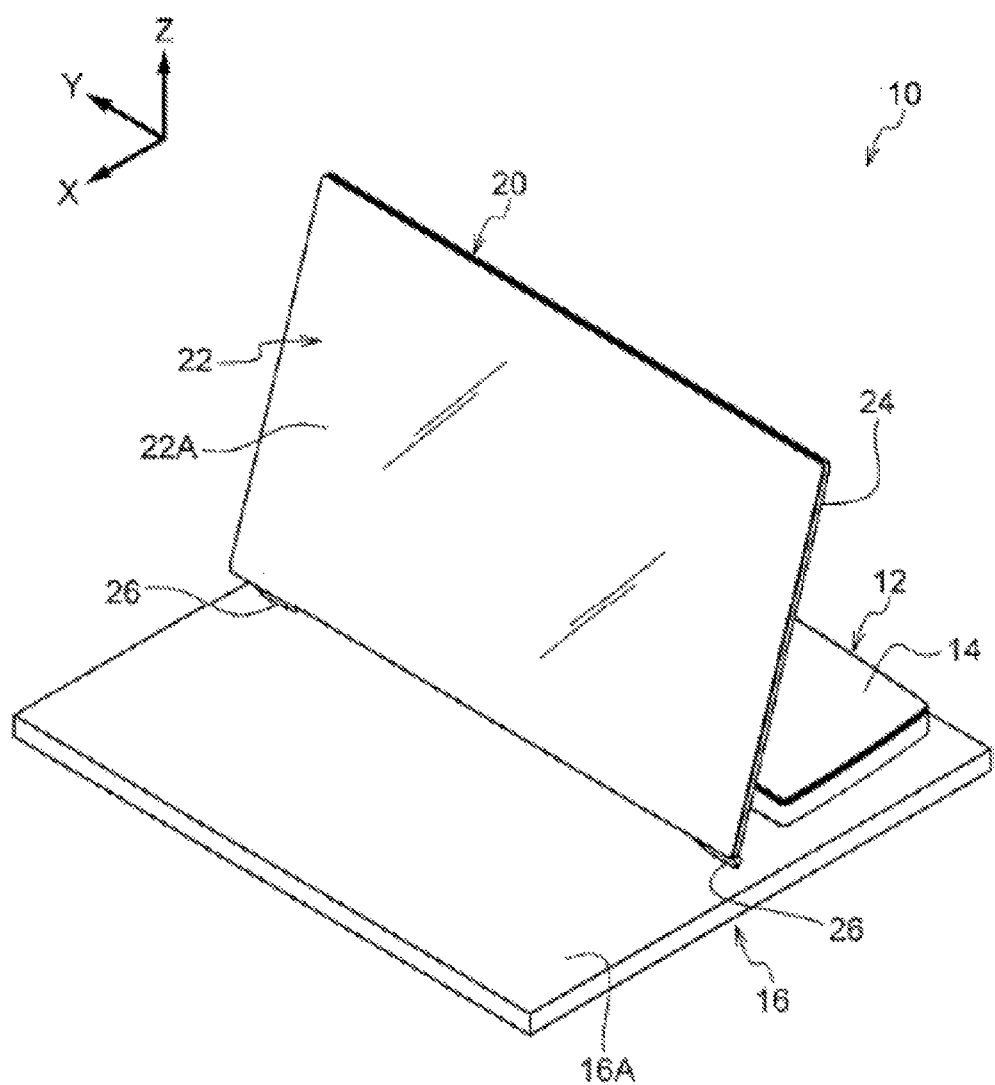
FIG. 1 is a perspective view of an electronic device according to a first embodiment viewed diagonally from the front side.
Figure 2:
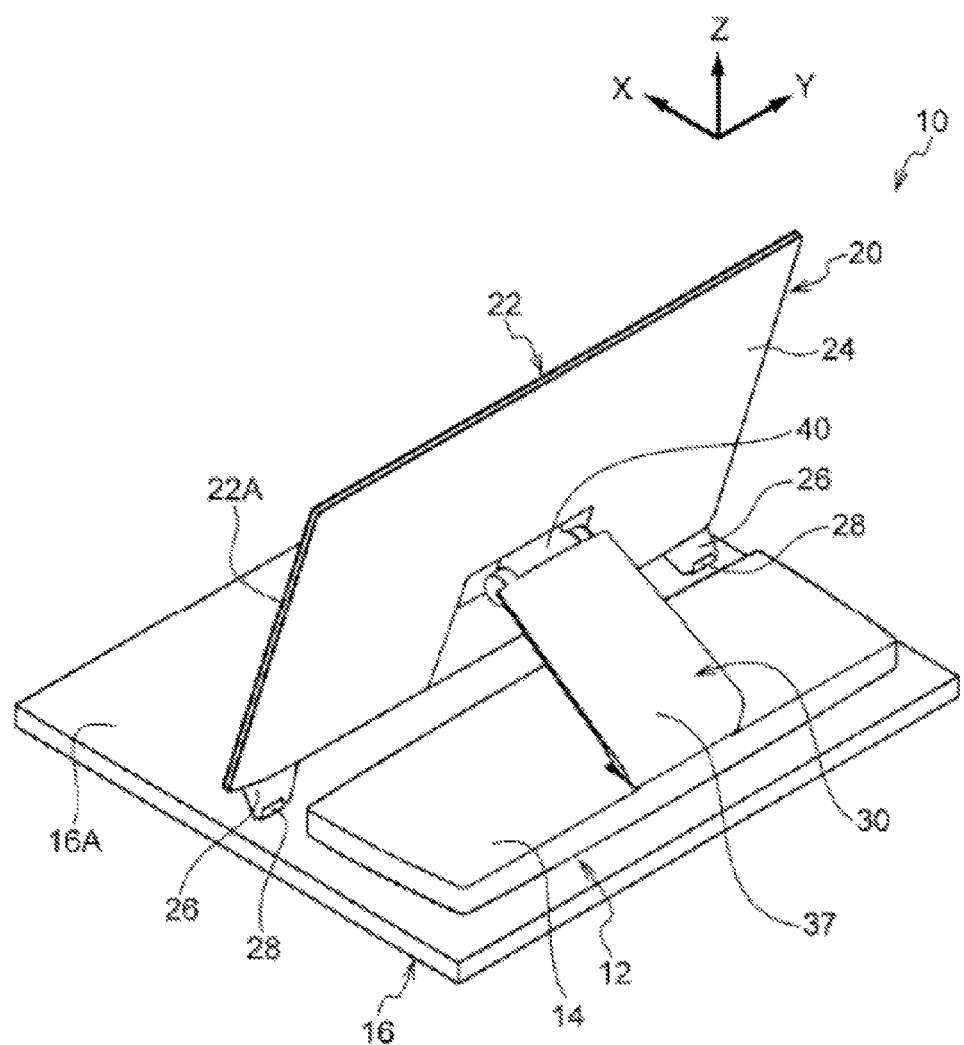
FIG. 2 is a perspective view of the electronic device illustrated in FIG. 1 viewed diagonally from the rear side.

As illustrated in FIGS. 1 and 2, an electronic device 10 according to the present embodiment includes a main device 12, a display 20, and a stand arm 30 (see FIG. 2). The electronic device 10 is preferably a display-integrated personal computer in which the main device 12 is integrated with the display 20 through the arm 30. Note that the main device 12 is an example of a fixed body. Furthermore, the display 20 is an example of a movable device.

The main device 12 includes a housing 14 that houses a substrate, on which electronic components and other components such as a CPU and the like are mounted. The housing 14 is formed in a thin box shape and is arranged such that its longitudinal direction extends in the width direction (the direction of the arrow Y) of the electronic device 10. The main device 12 is disposed, for example, on an installation surface 16A of a top board 16 of a desk or the like.

The display 20 is attached to the main device 12 through the stand arm 30. The display 20 includes a touch panel 22 and a back cover 24 that covers the back surface of the touch panel 22. The front side of the touch panel 22 is preferably a display surface 22A that displays an image or the like for touch operation. Note that in the present embodiment, the display 20 is preferably a full flat display having no difference in level in the outer peripheral portion of the display surface 22A.

A pair of supports 26 that support the display 20 are provided at the lower end portion of the back cover 24. The pair of supports 26 protrude downwards from the two ends of the lower end portion of the back cover 24 and support the display 20 with respect to the installation surface 16A. As illustrated in FIG. 2, non-slip members 28 formed of, for example, rubber are provided at the tips (lower end portions) of the pair of supports 26.

Figure 3:
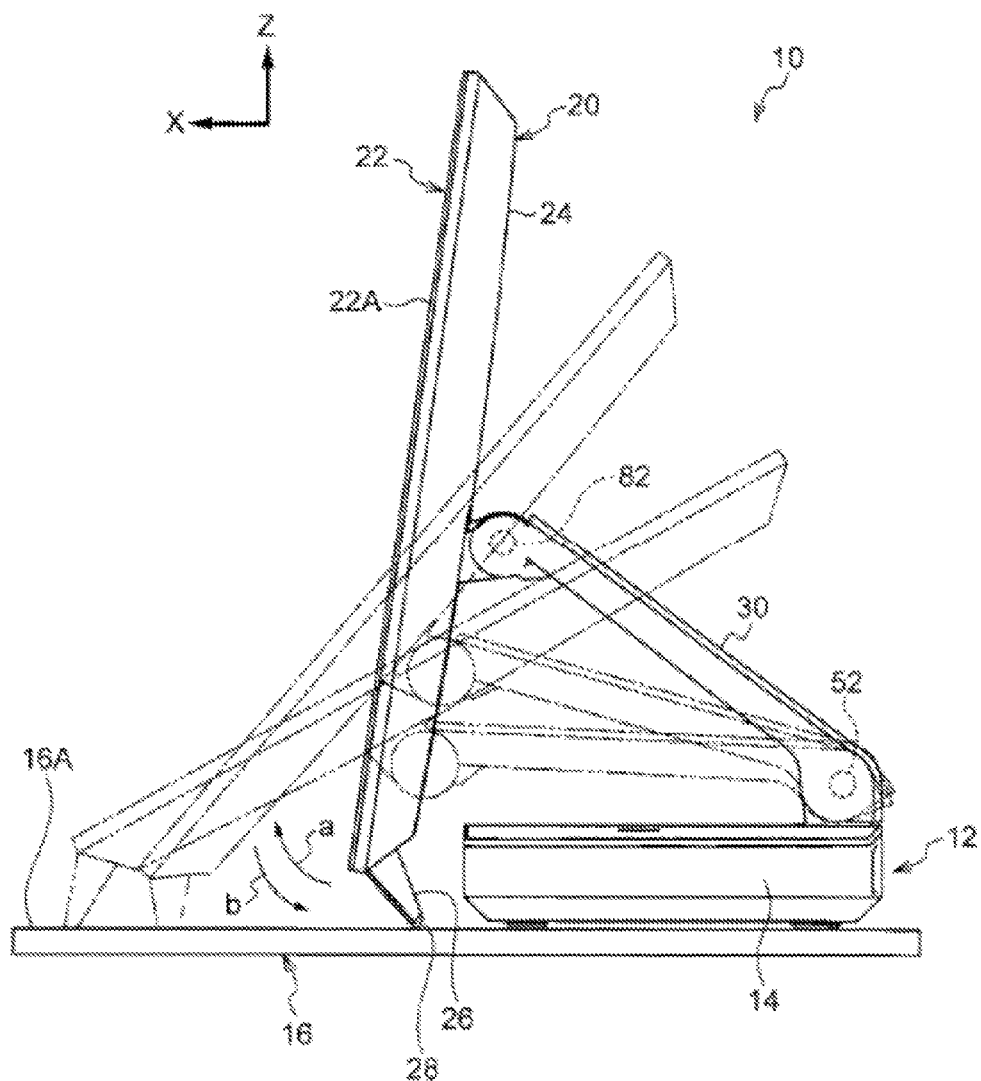
FIG. 3 is a side view of the electronic device illustrated in FIG. 1 viewed from an outer side in the width direction.

As illustrated in FIG. 3, the stand arm 30 is disposed on the back surface side of the display 20. The stand arm 30 is supported at the rear end portion of the main device 12 in a pivotal manner about a lower pivot shaft 52 whose axial direction extends in the width direction of the electronic device 10. In other words, the stand arm 30 may pivot (swing) with respect to the main device 12 in the front rear direction of the electronic device 10. The upper end portion of the stand arm 30 is attached to the back surface side of the display 20.

The display 20 is supported by the upper end portion of the stand arm 30 in a pivotal manner about an upper pivot shaft 82 that extends in the same direction as the lower pivot shaft 52. With the above, the display 20 may be pivoted between an upright position in which the display surface 22A faces the front side (arrow X) and a lying position in which the display surface 22A faces the upper side (arrow Z). Furthermore, upon pivoting of the stand arm 30 with respect to the main device 12, the display 20 may be displaced between a retracted position (initial position) that is illustrated by solid lines and an operation position that is illustrated by two-dot chain lines. Note that the display 20 is in the upright position when in the retracted position and is in the lying position when in the operation position.

Note that the pivoting of the display 20 and the pivoting of the stand arm 30 are interlocked with a link mechanism 110 described later. Specifically, when the lower portion of the display 20 in the retracted position is pulled up towards the front side (arrow a) such that the display 20 is pivoted from the upright position to the lying position, the stand arm 30 is tilted forward with respect to the main device 12. Accordingly, as illustrated by the two-dot chain lines, the display 20 is displaced to the operation position, which is a position in front of and below the retracted position, while the display surface 22A faces upwards. In other words, the display 20 is moved close to an operator while the display surface 22A faces upwards so that the operator may easily carry out touch operations on the display surface 22A of the display 20.

Furthermore, when the lower portion of the display 20 in the operation position is pushed back towards the rear side (arrow b) such that the display 20 is pivoted from the lying position to the upright position, the stand arm 30 stands up towards the rear side with respect to the main device 12. With the above, as illustrated by the solid lines, the display 20 is displaced to the retracted position, which is a position behind of and above the operation position, while the display surface 22A of the display 20 faces forward. In other words, the display 20 is moved to the eye level of the operator while the display surface 22A faces forward so that the operator may easily view the display surface 22A of the display 20. Hereinafter, a configuration of the stand arm 30 and the link mechanism 110 will be described in detail.

Stand Arm

Figure 4:
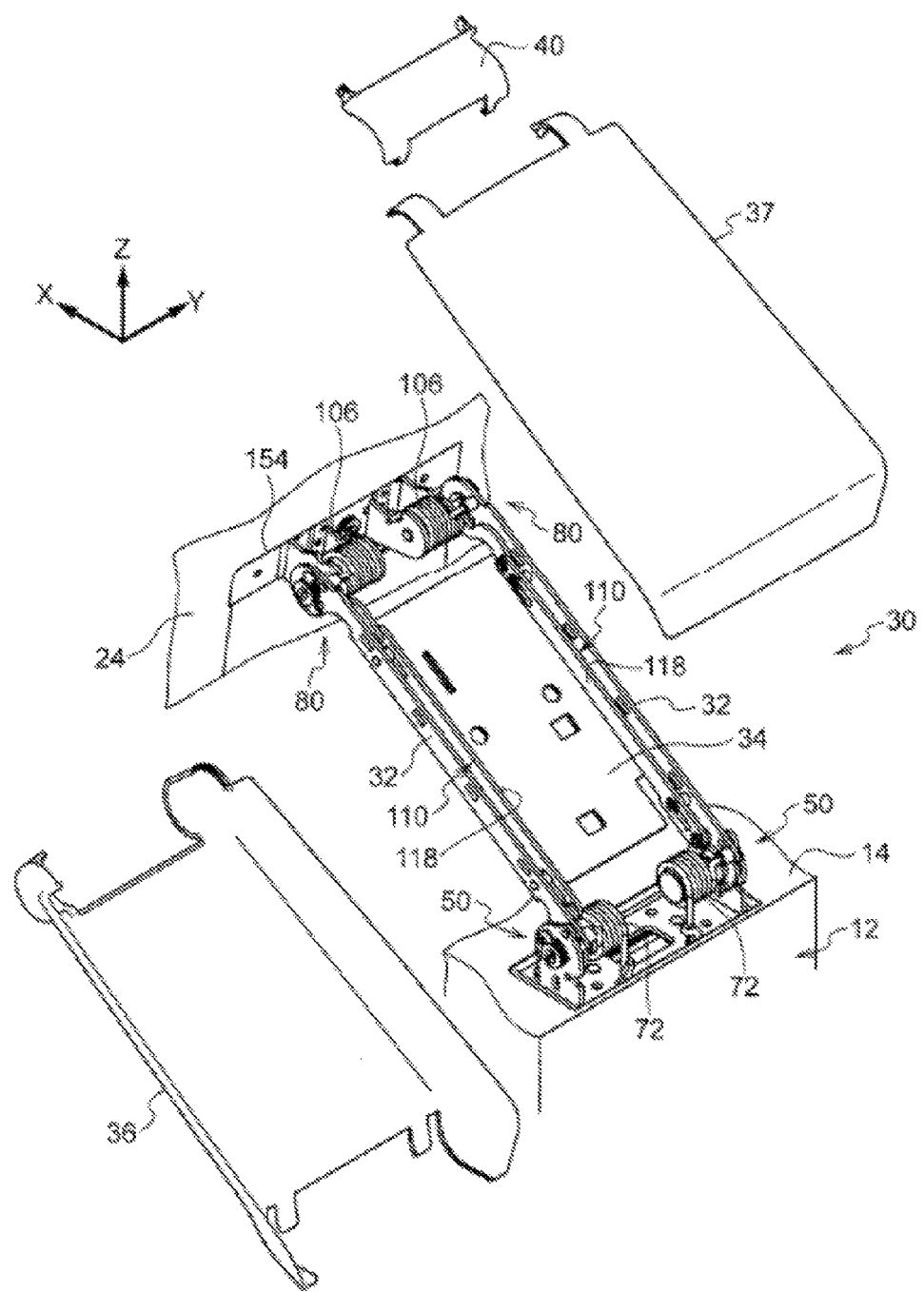
FIG. 4 is an exploded perspective view of a stand arm illustrated in FIG. 1 viewed diagonally from the upper side.

As illustrated in FIG. 4, the stand arm 30 includes a pair of movable arms 32, a panel frame 34, a front cover 36, a back cover 37, a hinge cover 40, lower hinge portions 50, upper hinge portions 80, and the link mechanisms 110.

The pair of movable arms 32 are provided along the two edge portions of the panel frame 34 and are connected together through the panel frame 34. Cables and the like (not shown) that connect the main device 12 and the display 20 are routed between the pair of movable arms 32.

The front cover 36 is attached on the front surface side of the panel frame 34. On the other hand, the back cover 37 is attached on the back surface side of the panel frame 34. Furthermore, the hinge cover 40 is attached on the back surface side of the upper hinge portions 80.

Lower Hinge Portion

Figure 5:
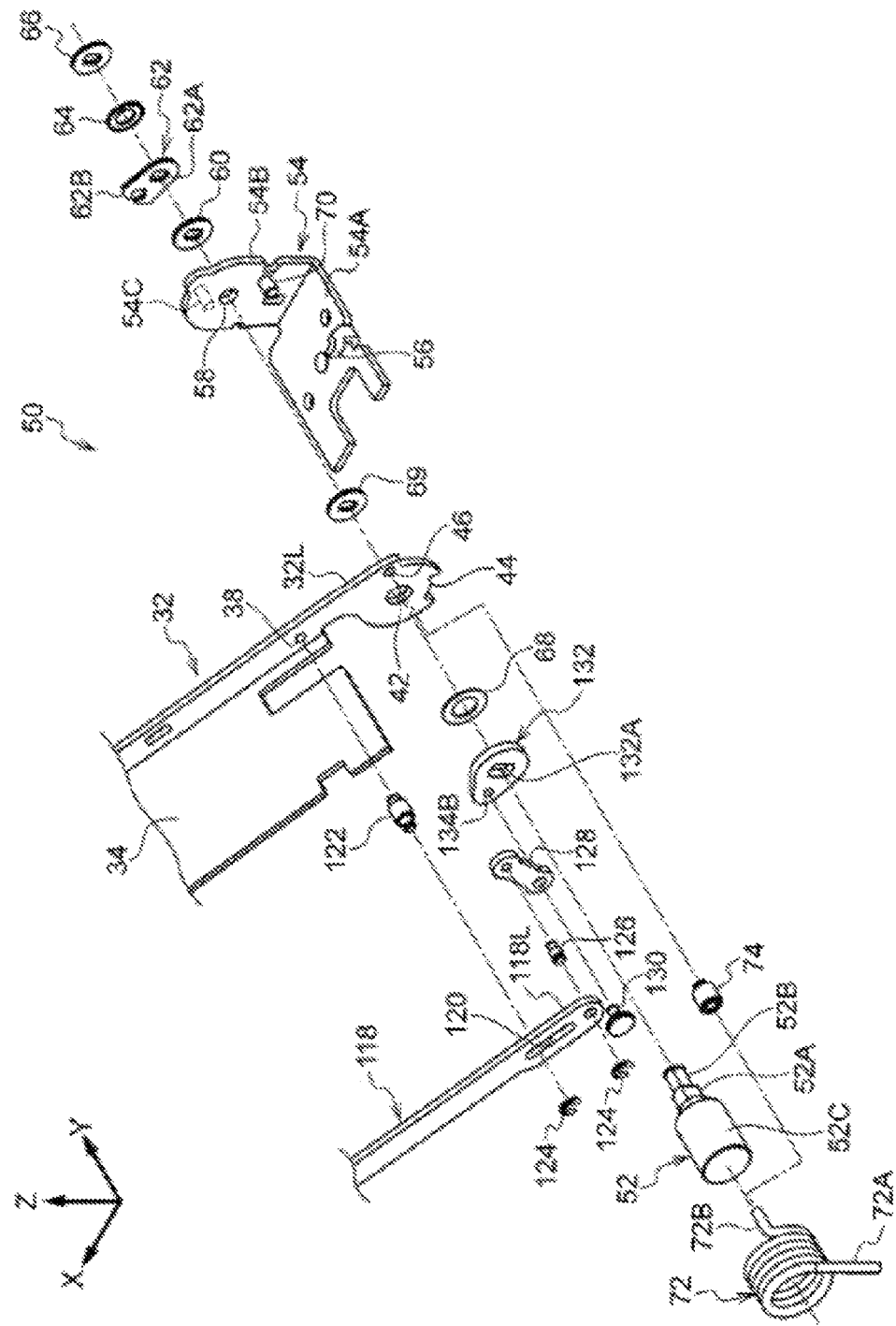
FIG. 5 is an exploded perspective view of a lower hinge portion illustrated in FIG. 4 viewed diagonally from the upper side.

The lower hinge portions 50 are each provided at a lower end portion of the pair of movable arms 32. As illustrated in FIG. 5, the lower hinge portion 50 includes the lower pivot shaft 52, a lower bracket 54, a disk spring 64, and a torsion spring (torsion coil spring) 72.

The lower pivot shaft 52 is disposed in the axial direction of the electronic device 10. The lower pivot shaft 52 is preferably a stepped shaft including two shaft portions 52A and 52B on one end side. Note that the diameter of the shaft portion 52B on the tip side is smaller than the diameter of the shaft portion 52A. Planar surfaces for restricting rotation are provided on the outer peripheral surface of each of the shaft portions 52A and 52B. The lower pivot shaft 52 is attached to the lower bracket 54.

The lower bracket 54 includes a fixed portion 54A and a sidewall portion 54B that stands erect from the fixed portion 54A. The fixed portion 54A is formed in a tabular shape and is fixed to the main device 12 with a screw or the like (not shown). A hook-shaped lock portion 56 to which one end 72A of the torsion spring 72 is locked is provided in the fixed portion 54A. The sidewall portion 54B is disposed on one side of the fixed portion 54A in the axial direction of the lower pivot shaft 52. Furthermore, a circular through hole 58, through which the shaft portion 52A of the lower pivot shaft 52 is inserted, is formed in the sidewall portion 54B. The lower end portion 32L of the movable arm 32 is disposed on the lower pivot shaft 52 side of the sidewall portion 54B.

A circular through hole 42, through which the shaft portion 52A of the lower pivot shaft 52 is inserted in a rotatable manner, is formed in the lower end portion 32L of the movable arm 32. As a result of inserting the shaft portion 52A of the lower pivot shaft 52 through the through hole 42 and the through hole 58 of the lower bracket 54 with a fixing link 132 and washers 68 and 69 in between, the movable arm 32 is supported by the lower bracket 54 in a pivotal manner about the lower pivot shaft 52.

Furthermore, a clip 62 is attached to the shaft portion 52B on the tip side of the lower pivot shaft 52 with a washer 60 in between. An elliptical hole 62A for restricting rotation is formed on one end side of the clip 62 such that the shaft portion 52B inserted therethrough is unable to rotate. Furthermore, a groove-shaped hook portion 62B is formed on the other end side of the clip 62. By fitting a pin 54C that projects from the sidewall portion 54B into the hook portion 62B, the rotation of the lower pivot shaft 52 with respect to the lower bracket 54 is restricted.

Furthermore, a fixing plate 66 for avoiding slip-offs is attached to the shaft portion 52B of the lower pivot shaft 52 with the disk spring 64 in between. The fixing plate 66 is caulked to the shaft portion 52B while the disk spring 64 is compressed. As a result, due to the restoring force of the disk spring 64, the washers 68 and 69 are pressed against the two sides of the lower end portion 32L of the movable arm 32; accordingly, frictional force generated in the portions where the lower end portion 32L of the movable arm 32 and the washers 68 and 69 are in contact with one another becomes large. With this frictional force, the movable arm 32 is maintained at a chosen pivoting angle against the lower bracket 54. Note that the disk spring 64 is an example of a lower pivot restriction member.

Furthermore, an engagement pin 70 that restricts the pivoting range of the movable arm 32 is provided on the sidewall portion 54B of the lower bracket 54. The engagement pin 70 projects from the sidewall portion 54B and is inserted through a cutaway 44 that is formed in the lower end portion 32L of the movable arm 32. Upon pivoting of the movable arm 32, the engagement pin 70 engages with either one of the two edge portions of the cutaway 44; accordingly, the pivoting range of the movable arm 32 with respect to the lower bracket 54 is restricted.

Figure 6:
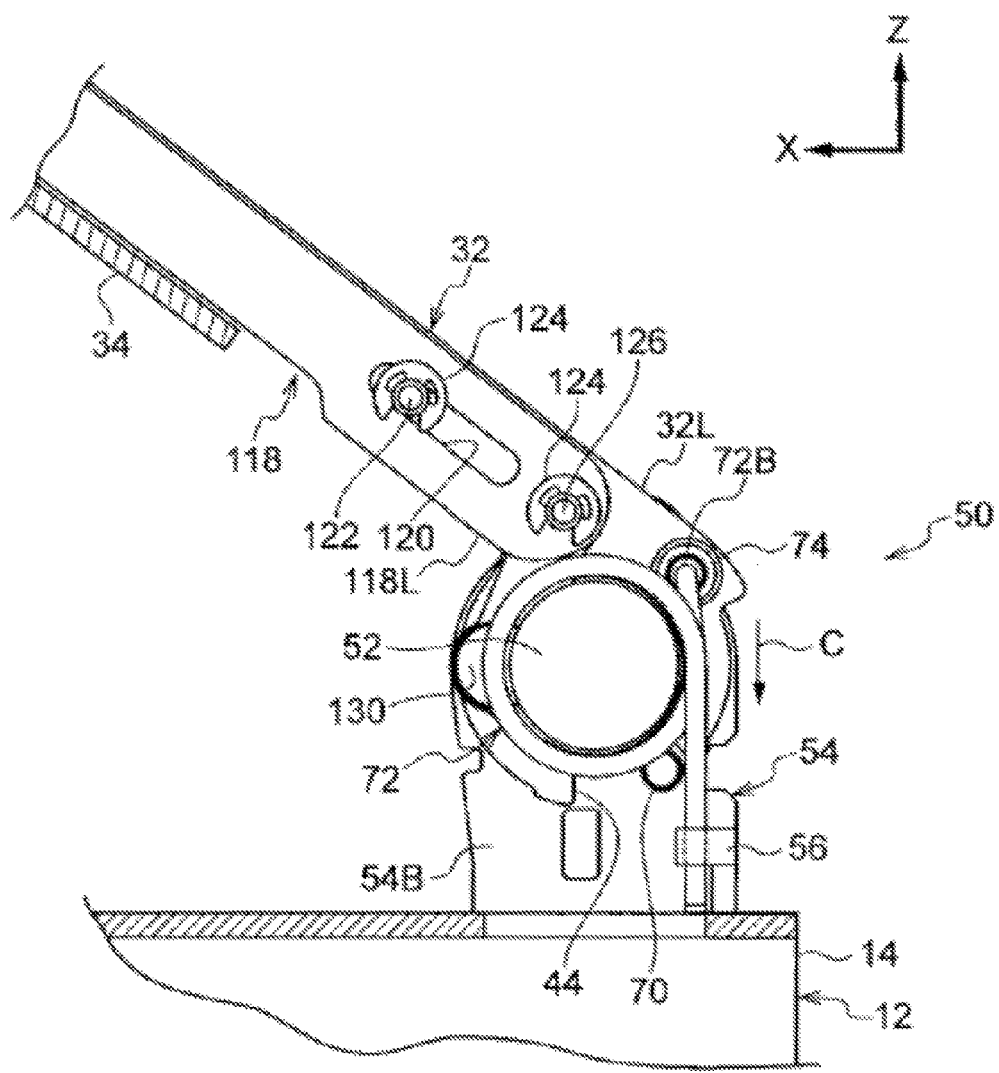
FIG. 6 is a side view of the lower hinge portion illustrated in FIG. 4 viewed from the outer side of the electronic device in the width direction.

The torsion spring 72 is attached to the other end portion 52C of the lower pivot shaft 52. The one end 72A of the torsion spring 72 is locked to the lock portion 56 of the lower bracket 54 described above. On the other hand, the other end 72B of the torsion spring 72 is locked to a mounting hole 46 formed in the lower end portion 32L of the movable arm 32 with a stepped boss 74 in between. As illustrated in FIG. 6, the torsion spring 72 biases the lower end portion 32L of the movable arm 32 in the arrow c direction such that the movable arm 32 pivots with respect to the lower bracket 54 towards the rear side (towards the upright position). Note that the torsion spring 72 is an example of a lower elastic body.

Upper Hinge Portion

Figure 7:
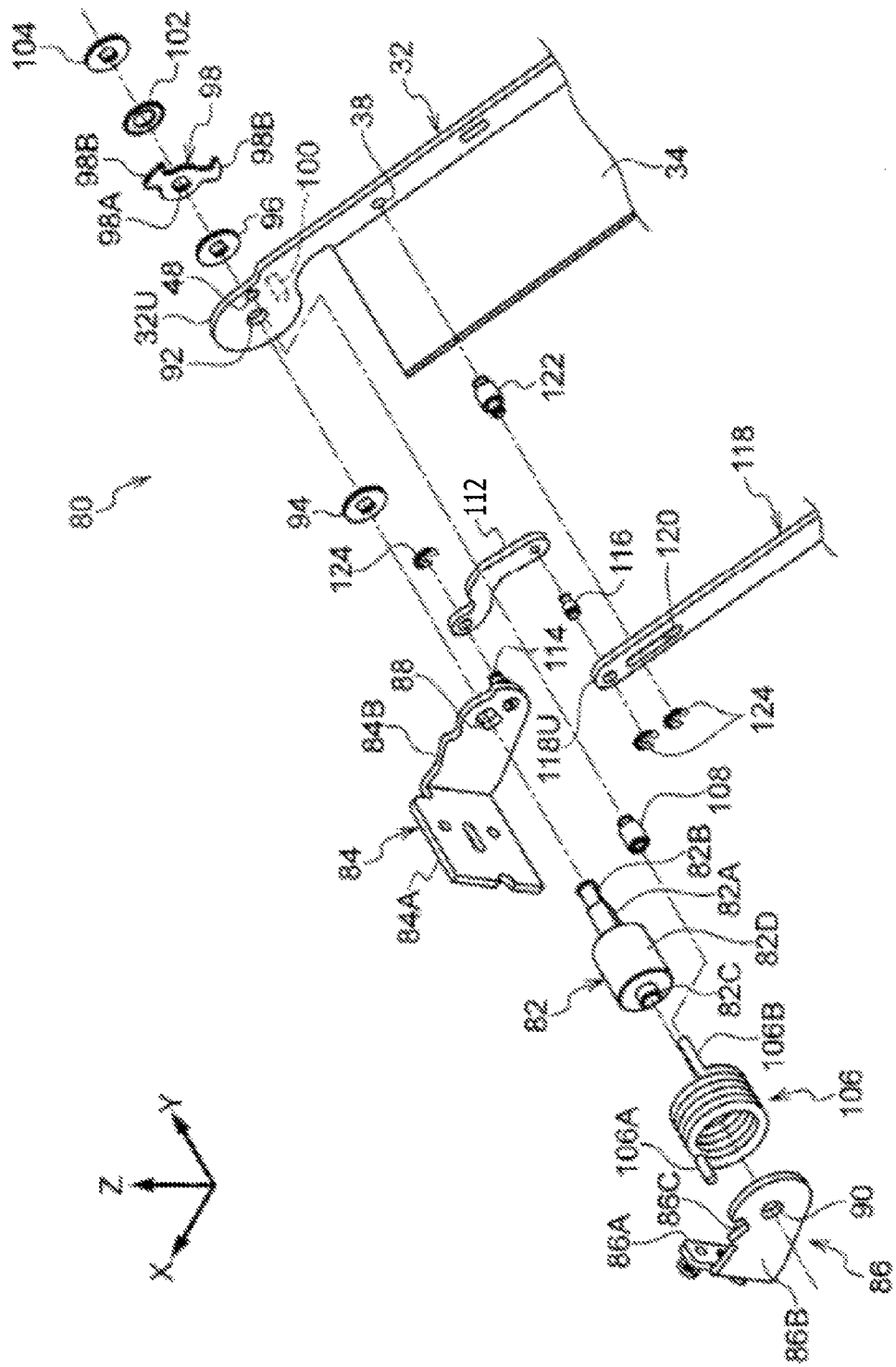
FIG. 7 is an exploded perspective view of an upper hinge portion illustrated in FIG. 4 viewed diagonally from the upper side.

As illustrated in FIG. 4, the upper hinge portions 80 are each provided at a corresponding upper end portion 32U of the pair of movable arms 32. As illustrated in FIG. 7, each upper hinge portion 80 includes the upper pivot shaft 82, an outside bracket 84, an inside bracket 86, a disk spring 102, and a torsion spring 106. Note that the outside bracket 84 is an example of an upper bracket.

The upper pivot shaft 82 is disposed in the width direction of the electronic device 10. The upper pivot shaft 82 is preferably a stepped shaft including two shaft portions 82A and 82B that have different diameters on one end side and a single shaft portion 82C on the other end side. Note that the diameter of the shaft portion 82B on the tip side is smaller than the diameter of the shaft portion 82A. Planar surfaces for restricting rotation are provided on the outer peripheral surface of each of the shaft portions 82A and 82B. The upper pivot shaft 82 is attached to the outside bracket 84 and the inside bracket 86.

The outside bracket 84 includes a fixed portion 84A and a sidewall portion 84B that stands erect with respect to the fixed portion 84A. The fixed portion 84A has a tabular shape and is fixed on the back surface side of the display 20 with the base plate 154 described later (see FIG. 19) in between. The sidewall portion 84B is disposed on one side of the fixed portion 84A in the axial direction of the upper pivot shaft 82. An elliptical hole 88 for restricting rotation is formed in the sidewall portion 84B such that the shaft portion 82A of the upper pivot shaft 82 inserted therethrough is unable to rotate.

Note that a structure connecting the base plate 154 and the outside bracket 84 will be described later in the second embodiment.

The inside bracket 86 includes a fixed portion 86A and a sidewall portion 86B that stands erect with respect to the fixed portion 86A. The fixed portion 86A is formed in a tabular shape and is fixed to the fixed portion 84A of the outside bracket 84. The sidewall portion 86B is disposed on the other side of the fixed portion 86A in the axial direction of the upper pivot shaft 82 so as to face the sidewall portion 84B of the outside bracket 84. A circular through hole 90, through which the shaft portion 82C of the upper pivot shaft 82 is inserted, is formed in the sidewall portion 86B.

The upper end portion 32U of the movable arm 32 is disposed on the side of the inside bracket 86 that is opposite to the outside bracket 84. A circular through hole 92, through which the shaft portion 82A of the upper pivot shaft 82 is inserted in a rotatable manner, is formed in the upper end portion 32U of the movable arm 32. As a result of inserting the shaft portion 82A of the upper pivot shaft 82 through the through hole 92 with a washer 94 in between, the outside bracket 84 and the inside bracket 86 are supported by the upper end portion 32U of the movable arm 32 in a pivotal manner about the upper pivot shaft 82.

Figure 8:
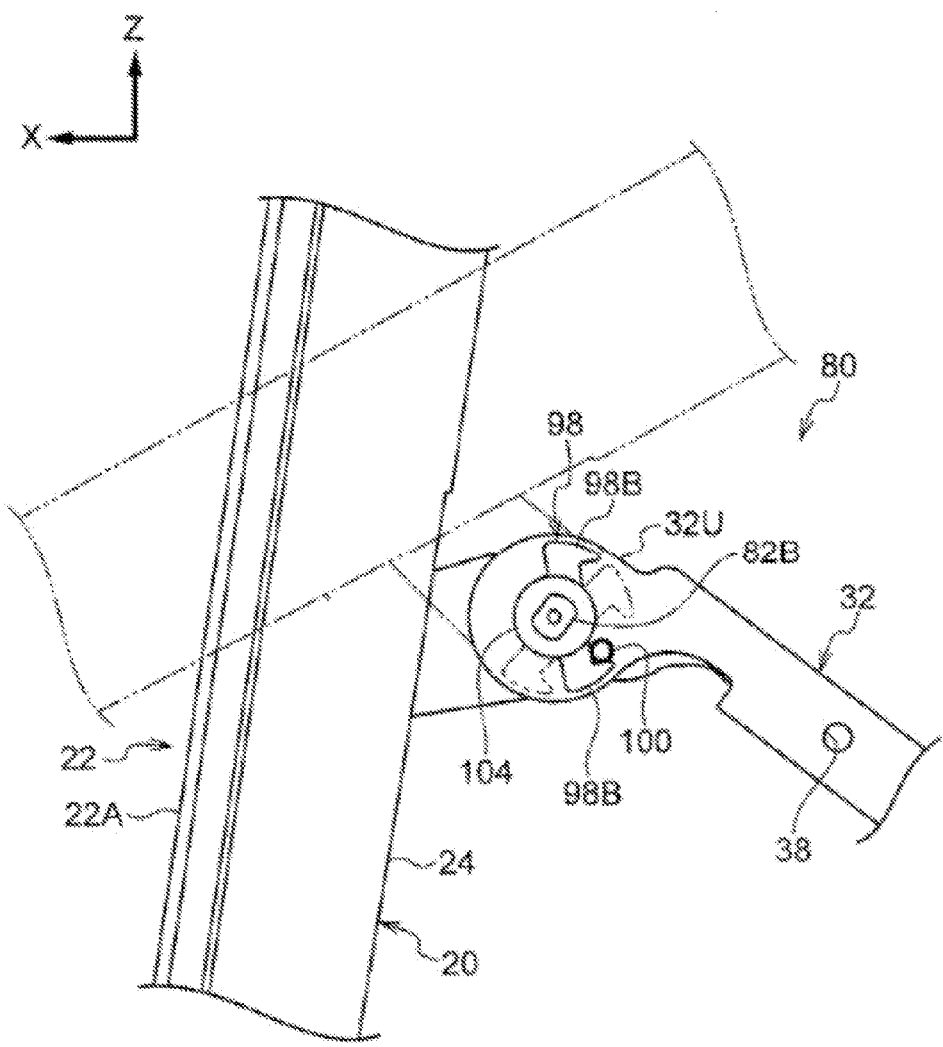
FIG. 8 is a side view of the upper hinge portion illustrated in FIG. 4 viewed from the outer side of the electronic device in the width direction.

Furthermore, a restriction plate 98 is attached to the shaft portion 82B on the tip side of the upper pivot shaft 82 with a washer 96 in between. An elliptical hole 98A for restricting rotation is formed in the restriction plate 98 such that the shaft portion 82B inserted therethrough is unable to rotate. Furthermore, a pair of engagement pieces 98B are included in the restriction plate 98. The pair of engagement pieces 98B are disposed on both sides of an engagement pin 100 that projects from the upper end portion 32U of the movable arm 32. Moreover, as illustrated in FIG. 8, upon pivoting of the upper pivot shaft 82, either one of the pair of engagement pieces 98B is engaged with the engagement pin 100; accordingly, the pivoting range of each of the outside bracket 84 and the inside bracket 86 with respect to the movable arm 32 is restricted.

As illustrated in FIG. 7, a fixing plate 104 for avoiding slip-offs is attached to the shaft portion 82B of the upper pivot shaft 82 with the disk spring 102 in between. The fixing plate 104 is caulked to the shaft portion 82B while the disk spring 102 is compressed. As a result, due to the restoring force of the disk spring 102, the washer 94 is pressed against the sidewall portion 84B of the outside bracket 84 such that frictional force and the like generated in the portion where the sidewall portion 84B and the washer 94 are in contact with each other becomes large. With this frictional force, the outside bracket 84 and the inside bracket 86 are maintained at a chosen pivoting angle against the movable arm 32. Note that the disk spring 102 is an example of an upper pivot restriction member.

Figure 9:
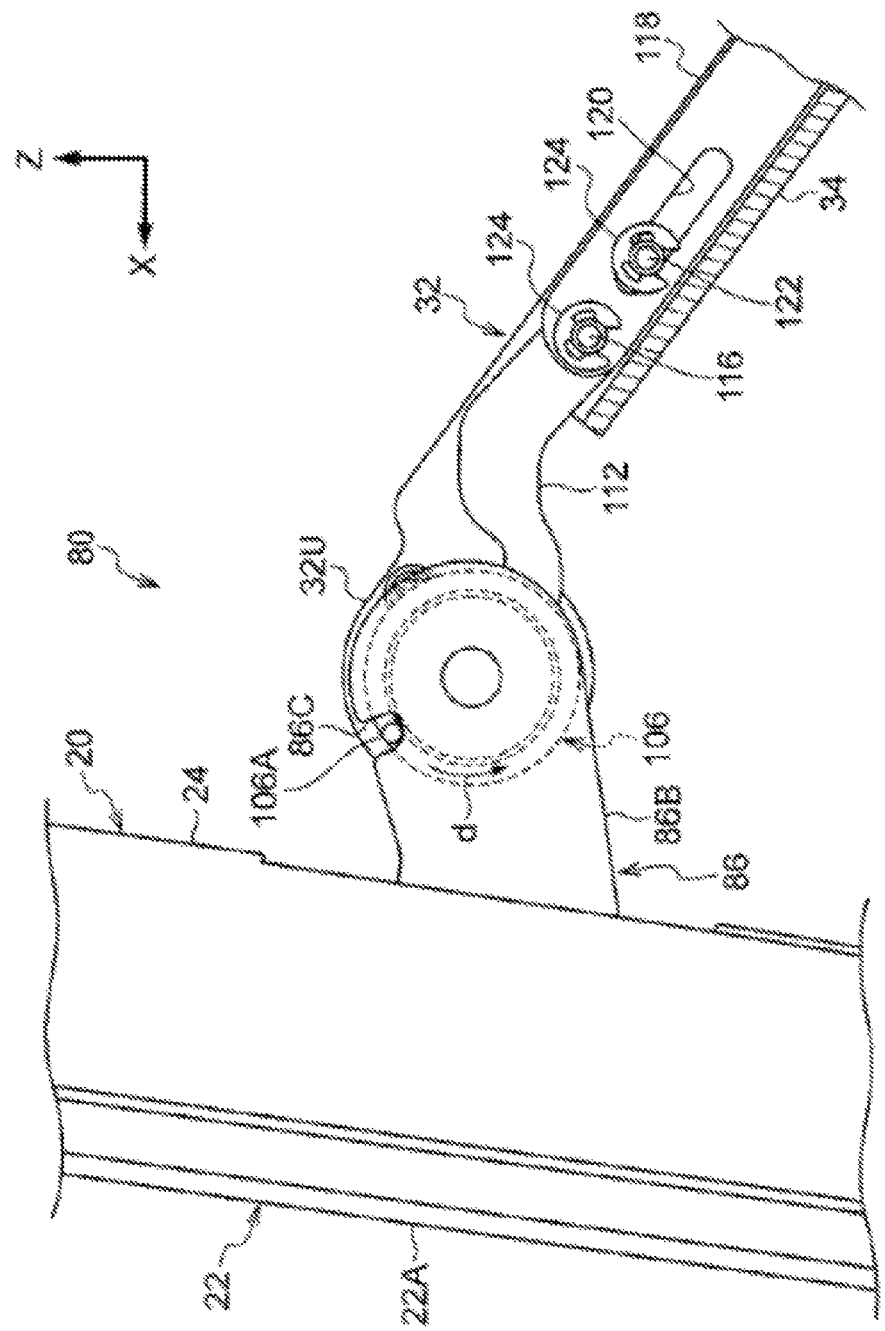
FIG. 9 is a side view of the upper hinge portion illustrated in FIG. 4 viewed from an inner side of the electronic device in the width direction.

The torsion spring 106 is attached to the other end 82D of the upper pivot shaft 82. One end 106A of the torsion spring 106 is locked to a lock portion 86C formed in the sidewall portion 86B of the inside bracket 86. On the other hand, the other end 106B of the torsion spring 106 is locked to a mounting hole 48 formed in the upper end portion 32U of the movable arm 32 with a stepped boss 108 in between. As illustrated in FIG. 9, the torsion spring 106 biases the sidewall portion 86B of the inside bracket 86 in the arrow d direction such that the display 20 is pivoted towards the upright position side. Note that the torsion spring 106 is an example of an upper elastic body.

Link Mechanism

Figure 10:
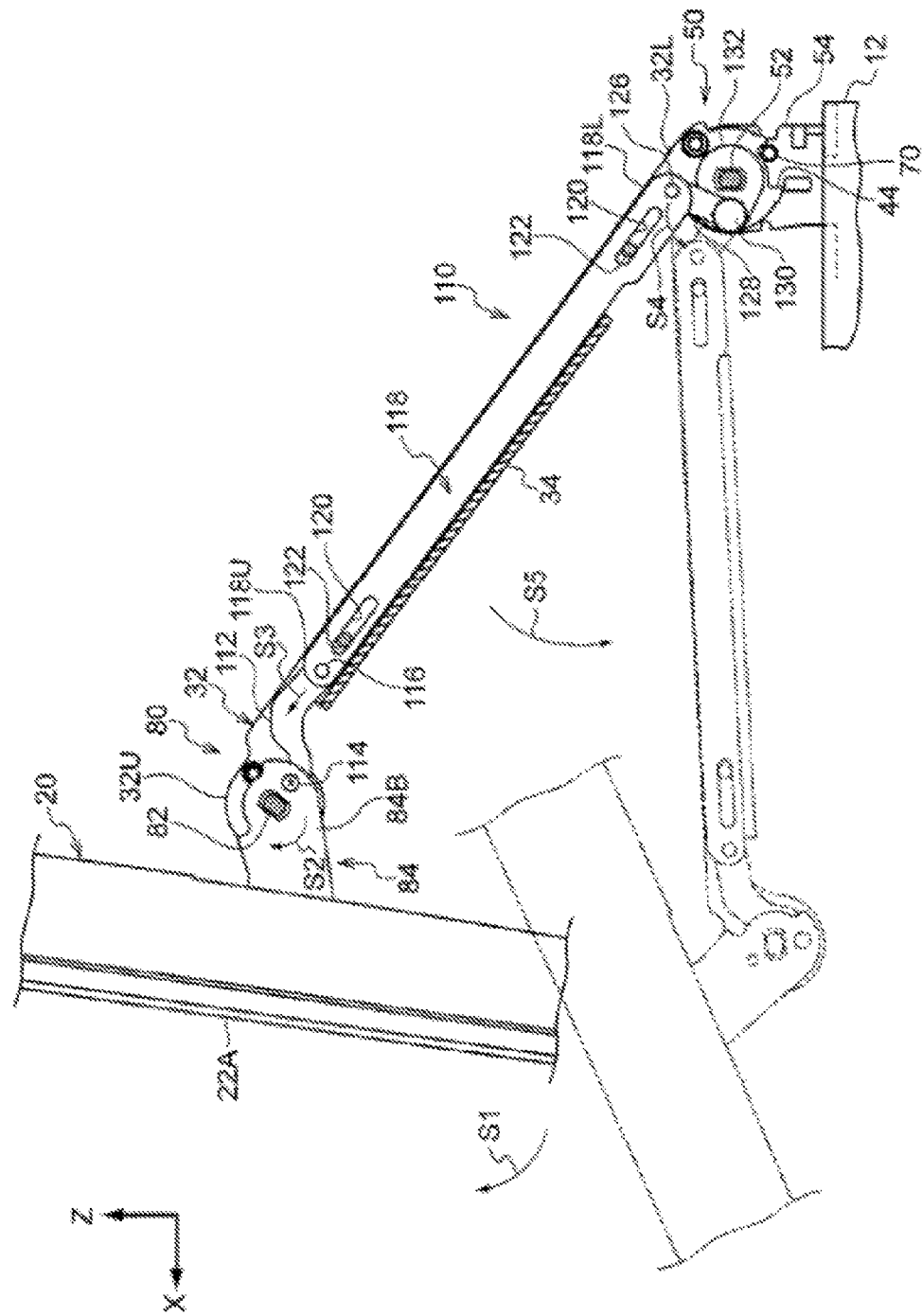
FIG. 10 is a side view of the movable arm and a link mechanism illustrated in FIG. 4 viewed from the outer side of the electronic device in the width direction.

As illustrated in FIG. 10, the link mechanism 110 is a mechanism that, upon pivoting of the display 20 with respect to the movable arm 32, pivots the movable arm 32 with respect to the main device 12 in a direction opposite to the pivoting direction of the display 20. Each link mechanism 110 includes a first connecting link 112, a slider 118, a second connecting link 128, and the fixing link 132.

The first connecting link 112 is formed in a hook shape and one end of the first connecting link 112 is connected to the sidewall portion 86B of the inside bracket 86 in a rotatable manner through a connection shaft 114. Furthermore, the other end of the first connecting link 112 is connected to an upper end portion 118U of the slider 118 in a rotatable manner through the connection shaft 116. Note that the connection shafts 114 and 116 are attached to the outside bracket 84 and the slider 118, respectively, with clips 124 (see FIG. 7).

The slider 118 has a long and thin tabular shape and is arranged along the movable arm 32. A long hole 120 that extends in the longitudinal direction of the slider 118 is formed in each of the upper portion and the lower portion of the slider 118. Guide pins 122 that are attached to mounting holes 38 of the movable arm 32 are inserted through the long holes 120 in a slidable manner. The slider 118 is supported by the guide pins 122 so as to be movable along the movable arm 32. Note that the guide pin 122 is attached to the slider 118 with the clip 124 (FIG. 7).

One end of the second connecting link 128 is connected to a lower end portion 118L of the slider 118 in a rotatable manner through a connection shaft 126. The other end of the second connecting link 128 is connected to the fixing link 132 in a rotatable manner through a connection shaft 130. The connection shaft 130 is positioned below the connection shaft 126 and in front of the lower pivot shaft 52. Note that the connection shaft 126 is attached to the slider 118 with a clip 124 (see FIG. 5).

The fixing link 132 has a plate cam shape. An elliptical hole 132A (see FIG. 5) for restricting rotation is formed in the middle portion of the fixing link 132 such that the shaft portion 52A of the lower pivot shaft 52 inserted therethrough is unable to rotate. Furthermore, in the fixing link 132, a circular mounting hole 134B (see FIG. 5) is formed in front of the hole 132A for restricting rotation. The other end of the second connecting link 128 is attached to the mounting hole 134B in a rotatable manner through the connection shaft 130 described above. Note that the connection shafts 114, 116, 126, and 130 are each a rotation shaft extending in the same direction as the lower pivot shaft 52 and the upper pivot shaft 82.

Subsequently, effects of the present embodiment will be described while an operation of the link mechanism 110 is described.

FIG. 10 illustrates the display 20 in the retracted position. From this state, when the lower end portion of the display 20 is pulled up towards the front side (arrow S1) such that the display 20 is pivoted towards the lying position side about the upper pivot shaft 82, each link mechanism 110 operates as follows.

The outside bracket 84 pivots (arrow S2) integrally with the display 20 towards the lying position side with respect to the movable arm 32. Accordingly, one end of the first connecting link 112 that is connected to the outside bracket 84 is moved below the upper pivot shaft 82, and the slider 118 that is connected to the other end of the first connecting link 112 is pulled up (arrow S3) towards the upper pivot shaft 82 side along the movable arm 32.

When the slider 118 is pulled up towards the upper pivot shaft 82 side, the second connecting link 128 that is connected to the lower end portion 118L of the slider 118 is pivoted forward (arrow S4) about the connection shaft 130, in other words, the second connecting link 128 is pivoted in a direction opposite to the pivoting direction of the display 20. Upon pivoting of the second connecting link 128, the slider 118 is pulled downwards. Accordingly, the movable arm 32 that is connected to the slider 118 through the upper pivot shaft 82 and the like is pivoted with respect to the main device 12 about the lower pivot shaft 52 in a direction opposite to the pivoting direction of the display 20. In other words, the movable arm 32 tilts forward towards the front side (arrow S5) with respect to the main device 12 about the lower pivot shaft 52.

As a result, as illustrated by the two-dot chain lines, the display 20 is displaced to the operation position. In other words, the display 20 is moved close to the operator while the display surface 22A faces upwards. Accordingly, it will be easier for the operator to carry out a touch operation on the display surface 22A of the display 20.

Figure 11:
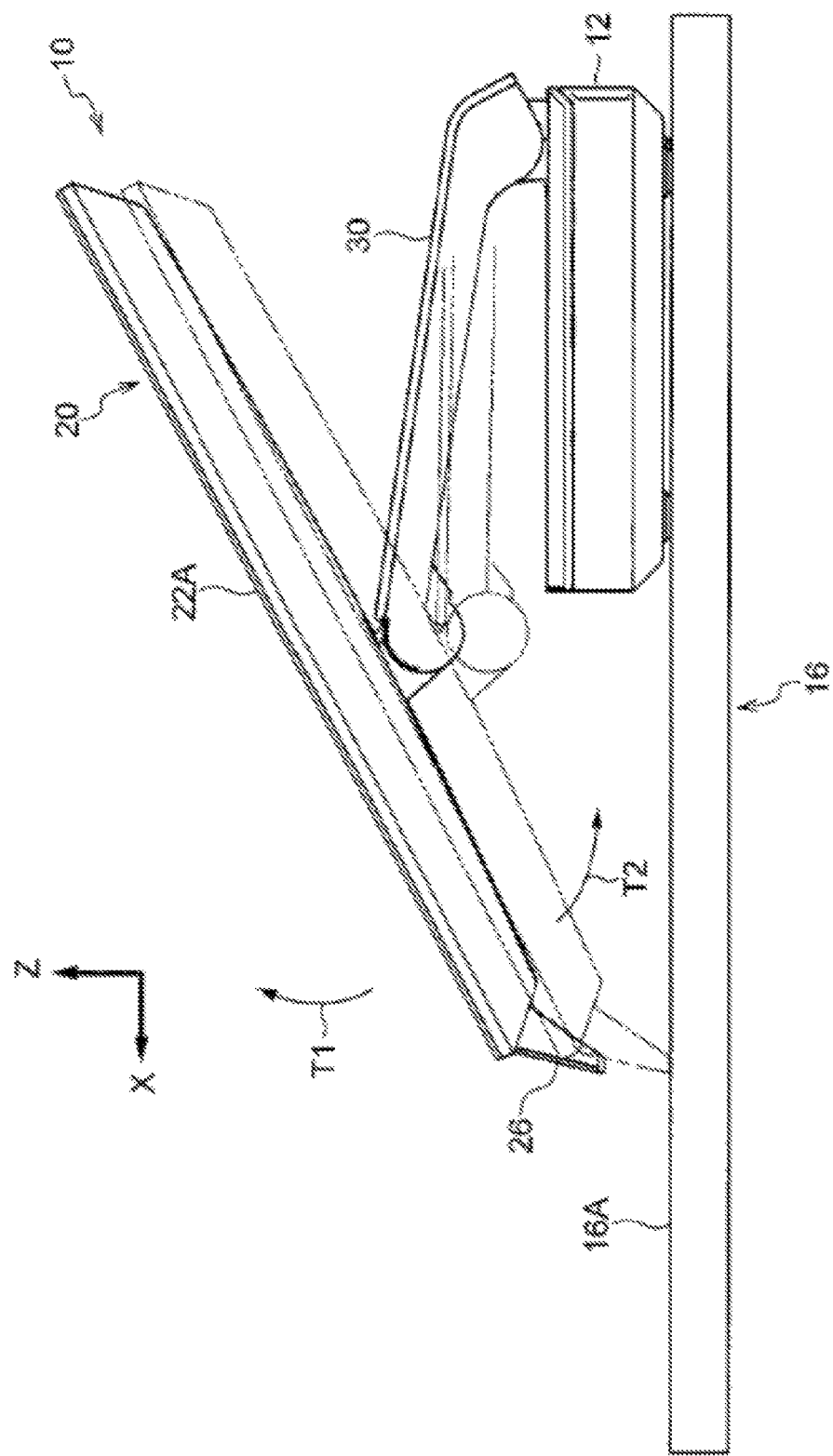
FIG. 11 is a side view of the electronic device illustrated in FIG. 1 viewed from the outer side of the electronic device in the width direction.

Next, as illustrated in FIG. 11, when returning the display 20 from the operation position to the retracted position, the display 20 is slightly lifted up (arrow T1) such that the pair of supports 26 are lifted from the installation surface 16A. While in this state, when the lower portion of the display 20 is pushed backwards (arrow T2) such that the display 20 is pivoted towards the upright position side about the upper pivot shaft 82, each link mechanism 110 operates as follows.

Figure 12:
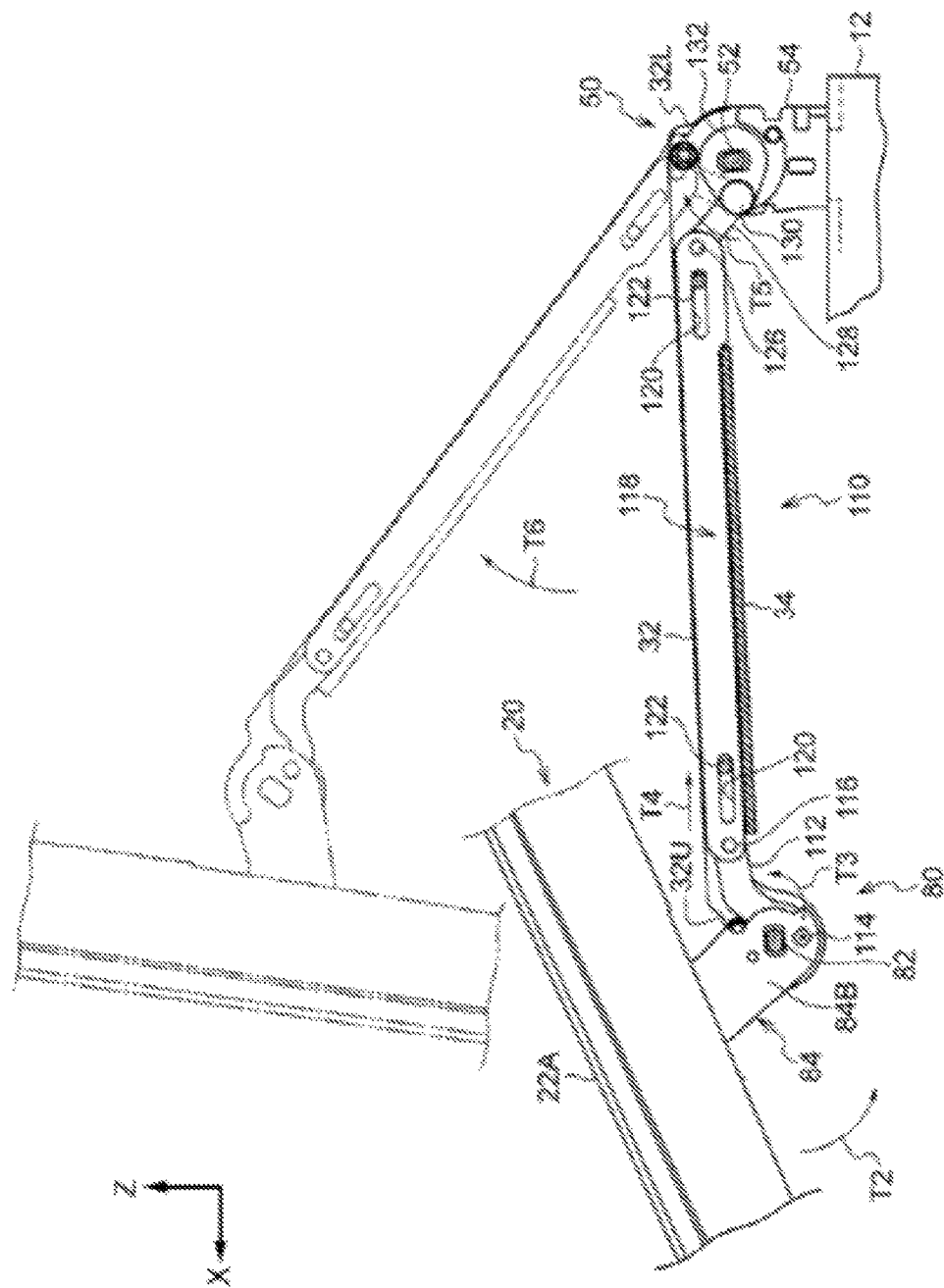
FIG. 12 is a side view of the movable arm and the link mechanism illustrated in FIG. 4 viewed from the outer side of the electronic device in the width direction.

As illustrated in FIG. 12, the outside bracket 84 pivots (arrow T3) integrally with the display 20 towards the upright position side with respect to the movable arm 32. Accordingly, one end of the first connecting link 112 is moved to the rear side of the upper pivot shaft 82 and the slider 118 is pushed down (arrow T4) towards the lower hinge portion 50 side along the movable arm 32.

When the slider 118 is pushed down towards the lower hinge portion 50 side, the second connecting link 128 is pivoted backwards (arrow T5) about the connection shaft 130, in other words, the second connecting link 128 is pivoted in the direction opposite to the pivoting direction of the display 20. Upon pivoting of the second connecting link 128, the slider 118 is pulled upwards and rearwards. Accordingly, the movable arm 32 that is connected to the slider 118 is pivoted with respect to the main device 12 about the lower pivot shaft 52 in a direction opposite to the pivoting direction of the display 20. In other words, the movable arm 32 stands up towards the rear side (arrow T6) with respect to the main device 12 about the lower pivot shaft 52.

As a result, as illustrated by the solid lines, the display 20 is displaced to the retracted position. In other words, the display 20 is moved to the eye level of the operator while the display surface 22A faces forward. Accordingly, it will be easier for the operator to view, as a monitor, the display surface 22A of the display 20.

As described above, in the present embodiment, since the movable arms 32 (the stand arm 30) pivot upon pivoting of the display 20, it is possible to adjust the angles of the display 20 and the movable arms 32 at the same time.

Furthermore, the sliders 118 are disposed along the movable arms 32 and move along the movable arms 32. Accordingly, compared with known techniques (see Japanese Laid-open Patent Publication No. 11-95866, for example) which employ a toothed belt that is wound around a pair of gears, the installation space of the sliders 118 is small. Accordingly, size reduction of the elements around the movable arms 32 may be achieved. In particular, the present embodiment may reduce the thickness of the middle portion of the stand arm 30 between the upper hinge portions 80 and the lower hinge portions 50. Furthermore, since known techniques (see Japanese Laid-open Patent Publication No. 11-95866, for example) employ gears, known techniques may be costly. On the other hand, no gear is employed in the present embodiment; accordingly, cost may be reduced.

Figure 13:
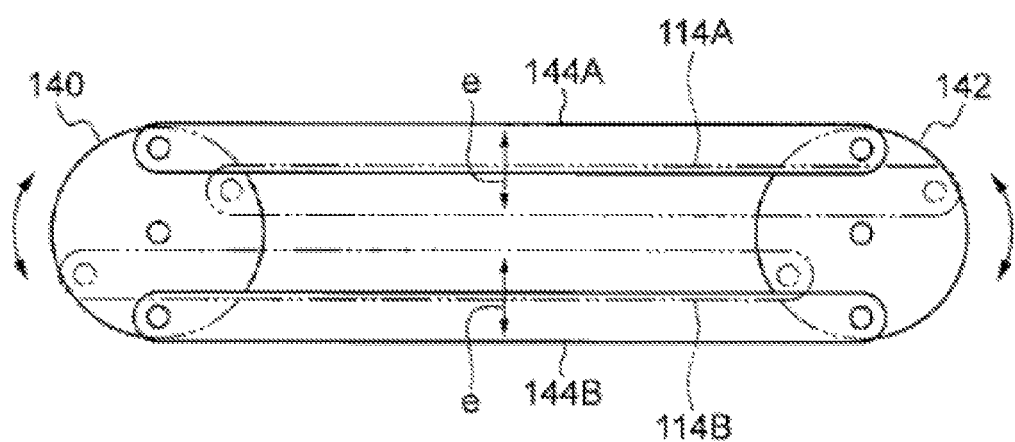
FIG. 13 is a schematic diagram illustrating parallel links according to a comparative example.

Note that, as illustrated in FIG. 13, a pair of parallel links 144A and 144B are known as a link mechanism that interlocks two pivot shafts 140 and 142 to each other, for example. However, the pair of parallel links 144A and 144B are swung in the arrow e direction upon pivoting of the two pivot shafts 140 and 142; accordingly, the installation space tends to be large. On the other hand, in the present embodiment, since the sliders 118 are moved along the movable arms 32, the installation space may be smaller.

Now, as illustrated in FIG. 11 referred to above, when moving the display 20 from the operation position to the retracted position, the operator slightly lifts up (arrow T1) the display 20. In other words, the operator first moves the display 20 in a direction (arrow T1) that is different from the direction (arrow T2) in which the display 20 is pivoted to the upright position. Because of the above, there may be cases in which it is difficult to move the display 20 to the retracted position.

As a countermeasure to the above, in the present embodiment, torsion springs 106 (see FIG. 9) that bias the display 20 towards the upright position side are provided in the upper hinge portion 80. With the above, it is easier to pivot the display 20 towards the upright position side while the display 20 is lifted up slightly. Accordingly, the display 20 may be moved from the operation position to the retracted position readily.

Moreover, when the display 20 is pivoted towards the upright position side, as described above, the link mechanism 110 operates to stand the movable arms 32 up. Furthermore, the movable arms 32 are biased in the standing up direction with the torsion springs 72 (see FIG. 6) that are provided in the lower hinge portion 50. Accordingly, the display 20 may be moved from the operation position to the retracted position even more readily.

Furthermore, the disc springs 64 and 102 are provided in the lower hinge portions 50 and the upper hinge portions 80, respectively. By generating frictional force in the lower hinge portions 50 and the upper hinge portions 80 with the disc springs 64 and 102, respectively, the movable arm 32 and the display 20 may each be maintained at a chosen pivoting angle.

Furthermore, frictional force generated in the upper hinge portions 80 with the disc springs 102 restricts the display 20 from pivoting when, for example, the operator carries out a touch operation on the display surface 22A of the display 20. Furthermore, the display 20 is biased towards the upright position side with the torsion springs 106. Accordingly, even if a touch operation is carried out on the display surface 22A of the display 20 at a position above the upper pivot shaft 82, the display 20 may be restricted from pivoting towards the lying position side. Furthermore, owing to the biasing force of the torsion springs 106, the pair of supports 26 are pressed against the installation surface 16A; accordingly, frictional force generated in portions where the pair of supports 26 and the installation surface 16A are in contact with one another is increased. Accordingly, sliding of the pair of supports 26 with respect to the installation surface 16A is suppressed and, thus, the stability of the display 20 is improved.

Figure 14:
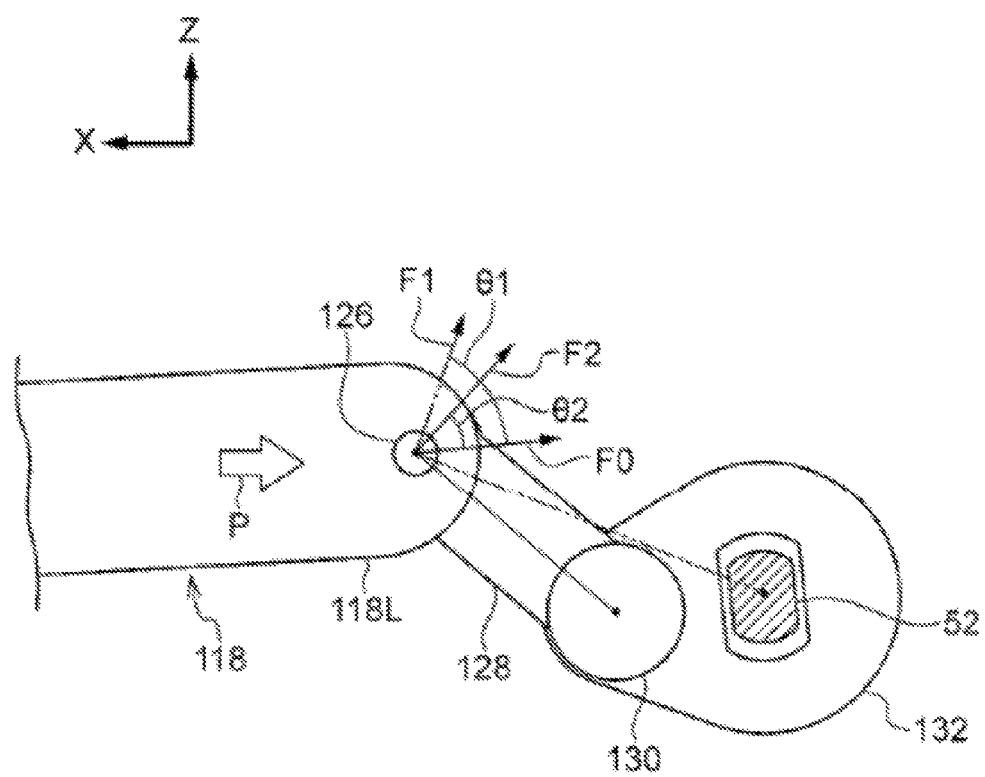
FIG. 14 is an enlarged view of FIG. 12 illustrating a slider, a second connecting link, and a fixing link.

Furthermore, FIG. 14 illustrates the slider 118 and the second connecting link 128 while the display 20 is in the operation position. When the display 20 is moved to the retracted position from the above state, one end of each second connecting link 128 is pushed towards the corresponding lower pivot shaft 52 side with the lower end portion 118L of the corresponding slider 118. In such a case, if the connection shaft 130 and the lower pivot shaft 52 are positioned on the same axial line, it will be difficult to pivot the second connecting link 128. On the other hand, in the present embodiment, the connection shaft 130 of the second connecting link 128 is positioned below the connection shaft 126 and between the connection shaft 126 and the lower pivot shaft 52; accordingly, the second connecting link 128 may be pivoted more easily.

The above will be described more specifically. For example, if the connection shaft 130 is positioned coaxially with the lower pivot shaft 52, the angle defined by the moving direction F0 of the slider 118 and the pivoting direction F1 of the second connecting link 128 will be $\theta 1$. On the other hand, in the present embodiment, the angle defined by the moving direction F0 of the slider 118 and the pivoting direction F2 of the second connecting link 128 is $\theta 2$ which is smaller than $\theta 1$ ($\theta 1 > \theta 2$). In other words, compared with the case in which the connection shaft 130 is positioned coaxially with the lower pivot shaft 52, in the present embodiment, the second connecting link 128 is more easily pivoted since the direction of action of the force P of the slider 118 and the pivoting direction F2 of the second connecting link 128 are approximate to each other. Accordingly, the reciprocating motion of the slider 118 may be efficiently converted into the pivoting motion of the second connecting link 128.

Modifications of the first embodiment described above will be described next.

In the first embodiment described above, an example in which the torsion spring 72 is used as the upper elastic body is described; however, the upper elastic body is not limited to the torsion spring 72. A pull spring, for example, may be used as the upper elastic body. The same applies to the torsion spring 106.

Furthermore, in the first embodiment described above, an example in which the disk spring 64 is used as the lower pivot restriction member is described; however, the lower pivot restriction member is not limited to the disk spring 64. A spring washer, for example, may be used as the lower pivot restriction member. The same applies to the upper pivot restriction member. Furthermore, the disc springs 64 and 102 may be omitted as appropriate.

Furthermore, in the first embodiment described above, an example in which the display 20 is provided with the pair of supports 26 is described; however, not limited to this, the shape, the arrangement, the number, and the like of the pair of supports 26 may be changed as appropriate. Furthermore, the pair of supports 26 may be omitted as appropriate. Note that when the pair of supports 26 are omitted, in order to maintain the display 20 at a predetermined pivoting angle, the biasing force of the torsion springs 106 may be set smaller than the frictional force (static frictional force) that is generated in the upper hinge portions 80 by the disk springs 102.

Furthermore, in the first embodiment described above, an example is illustrated in which the display 20 including the touch panel 22 is employed as the movable device; however, the movable device is not limited to the display 20 including the touch panel 22. The movable device may be, for example, rather than one employing a touch panel, one employing a control panel provided with push buttons and the like.

Furthermore, in the first embodiment described above, an example is illustrated in which the main device 12 is employed as the fixed body; however, the fixed body is not limited to the main device 12. For example, the fixed body may be a pedestal or the like that supports the stand arm 30.

A description of a second embodiment will be given next. Note that members that are the same as those of the first embodiment are denoted with the same reference numerals and detailed descriptions thereof are omitted.

In the second embodiment, a connection structure between the base plate 154 that is fixed to the back surface of the display 20 and the outside bracket 84 of the upper hinge portion 80 will be described.

Figure 15:
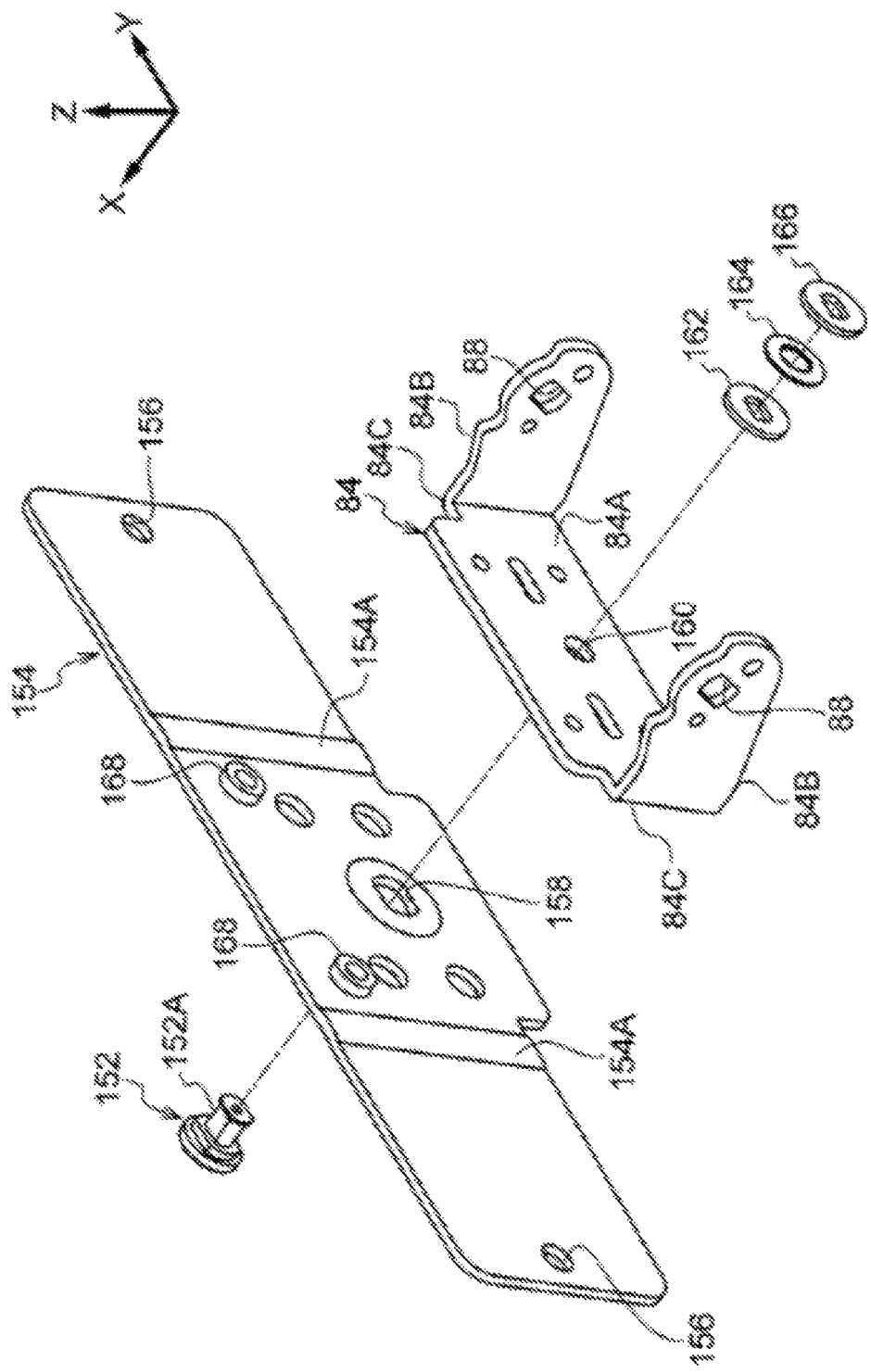
FIG. 15 is an exploded perspective view of a base plate and an outside bracket according to a second embodiment viewed diagonally from the upper side.
Figure 16:
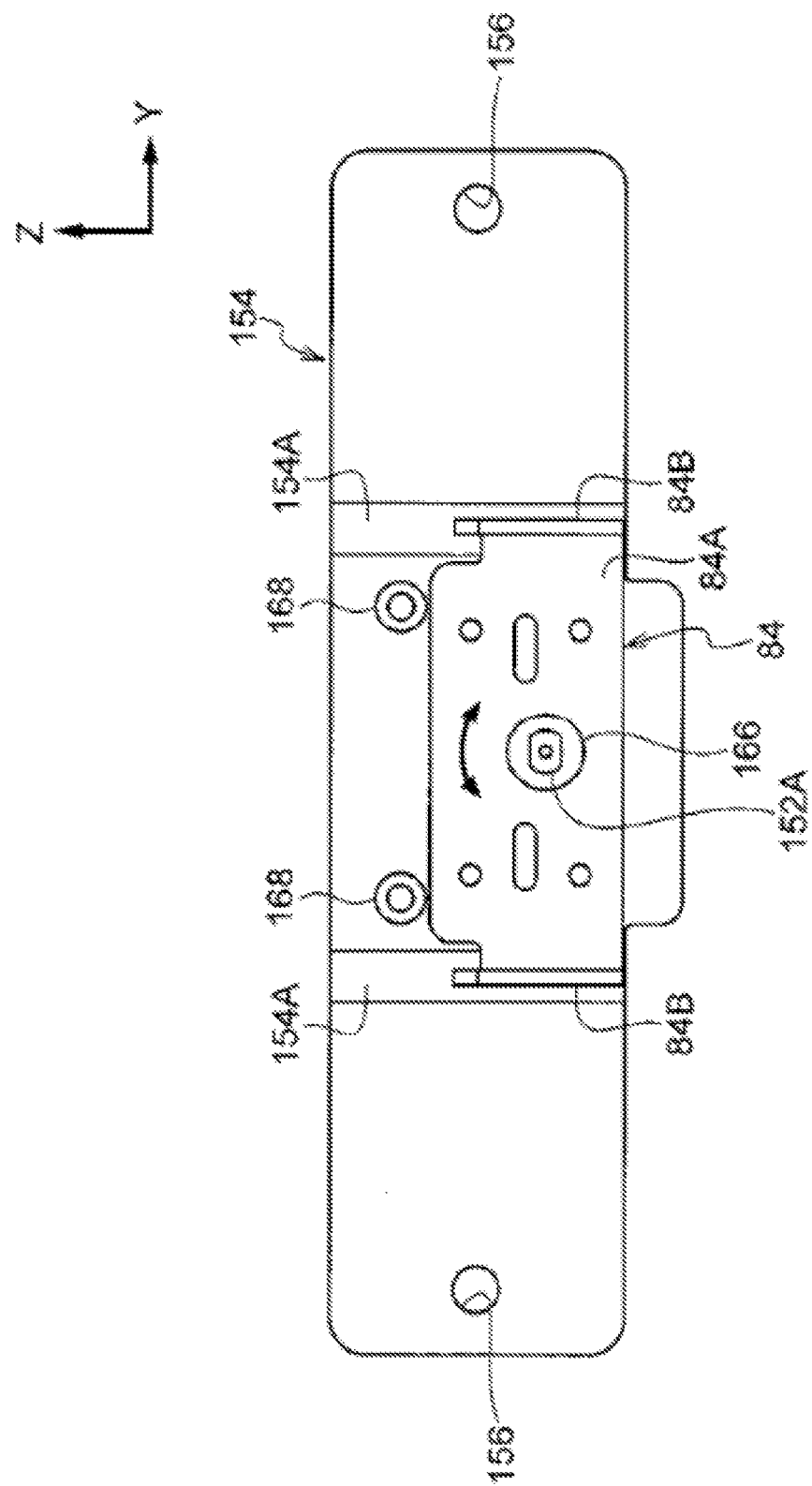
FIG. 16 is a rear view of the base plate and the outside bracket illustrated in FIG. 15 viewed from the rear side.

As illustrated in FIGS. 15 and 16, the connection structure includes a pivot shaft 152, the base plate 154, and the outside bracket 84. The pivot shaft 152 is disposed so as to extend in a direction that intersects the display surface 22A of the display 20. Note that, in the present embodiment, the pivot shaft 152 is disposed so as to be orthogonal to the display surface 22A of the display 20. The pivot shaft 152 is preferably a stepped shaft including a shaft portion 152A on one end thereof. Planner surfaces for restricting rotation are formed on the outer peripheral surface of the shaft portion 152A.

The base plate 154 is disposed in the width direction of the electronic device 10. A mounting hole 156 is provided in each of the two end portions of the base plate 154. The base plate 154 is fixed to the back surface side of the display 20 (see FIG. 19) with a screw or the like (not shown) that is inserted through each mounting hole 156.

Furthermore, a pair of convex portions 154A that support the outside bracket 84 are formed on the base plate 154. The pair of convex portions 154A extend in the up-down direction along the edge portions 84C of the outside bracket 84 and project to the outside bracket 84 side in a convex manner. The edge portions 84C of the outside bracket 84 is pushed against the pair of convex portions 154A with the biasing force of a disk spring 164 described later.

An elliptical hole 158 for restricting rotation is formed in the middle portion of the base plate 154 such that the shaft portion 152A of the pivot shaft 152 inserted therethrough is unable to rotate. On the other hand, a circular through hole 160 is formed in the fixed portion 84A of the outside bracket 84 such that the shaft portion 152A of the pivot shaft 152 is inserted in a rotatable manner. As a result of inserting the shaft portion 152A of the pivot shaft 152 through the hole 158 for restricting rotation and the through hole 160, the outside bracket 84 is connected to the base plate 154 in a pivotal manner about the pivot shaft 152. In other words, the display 20 is supported in a pivotal manner with respect to the movable arm 32 about the pivot shaft 152, which extends in the direction intersecting the display surface 22A.

Figure 17A:
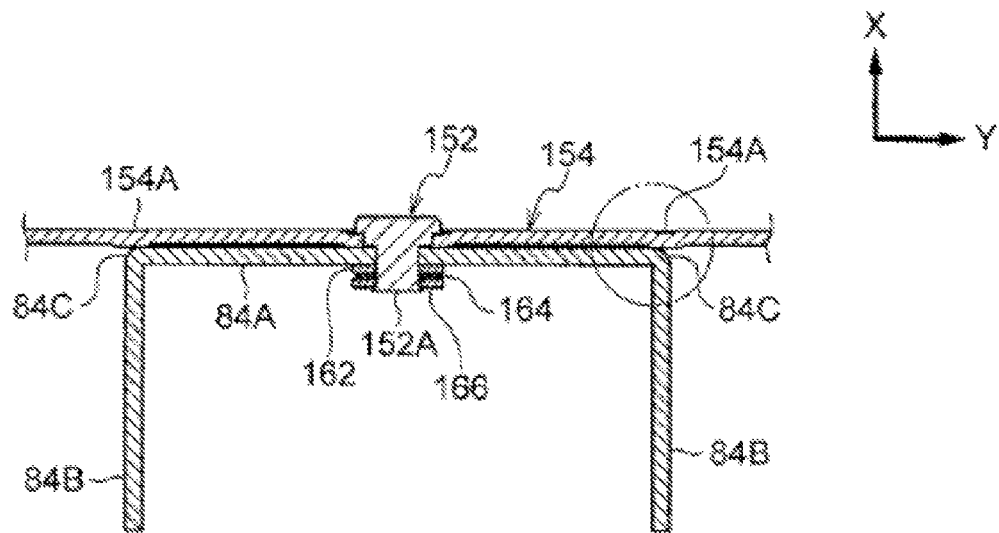
FIG. 17A is a planar cross section illustrating the base plate and the outside bracket illustrated in FIG. 16.
Figure 17B:
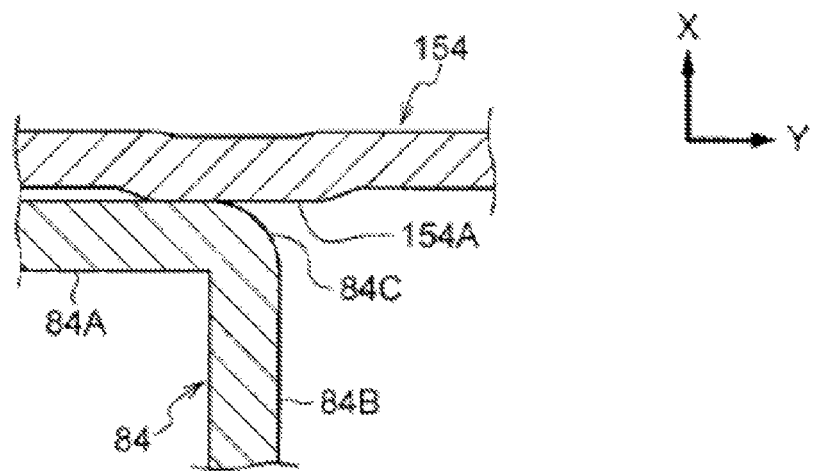
FIG. 17B is a partially exploded view of FIG. 17A.

Furthermore, a fixing plate 166 is attached to the shaft portion 152A of the pivot shaft 152 with a washer 162 and the disk spring 164 in between. The fixing plate 166 is caulked to the shaft portion 152A while the disk spring 164 is compressed. The washer 162 is pressed against the fixed portion 84A of the outside bracket 84 with the restoring force of the disk spring 164. Furthermore, as illustrated in FIGS. 17A and 17B, the edge portions 84C of the outside bracket 84 is pressed against the pair of convex portions 154A of the base plate 154 with the restoring force of the disk spring 164. Note that the disk spring 164 is an example of a pivot restricting member.

As illustrated in FIGS. 15 and 16, a pair of engagement portions 168 that limit the pivoting range of the outside bracket 84 are provided in the base plate 154. The pair of engagement portions 168 are each formed in a cylindrical shape and protrude towards the outside bracket 84 side from the base plate 154. The pair of engagement portions 168 are disposed above the fixed portion 84A of the outside bracket 84 and on both sides of the pivot shaft 152. Furthermore, as illustrated in FIG. 18, a gap 170 is formed between each engagement portion 168 and an upper edge portion of the fixed portion 84A of the outside bracket 84. The outside bracket 84 is preferably capable of pivoting with respect to the base plate 154 within the range permitted by the gap 170.

A function of the second embodiment will be described next.

Figure 19:
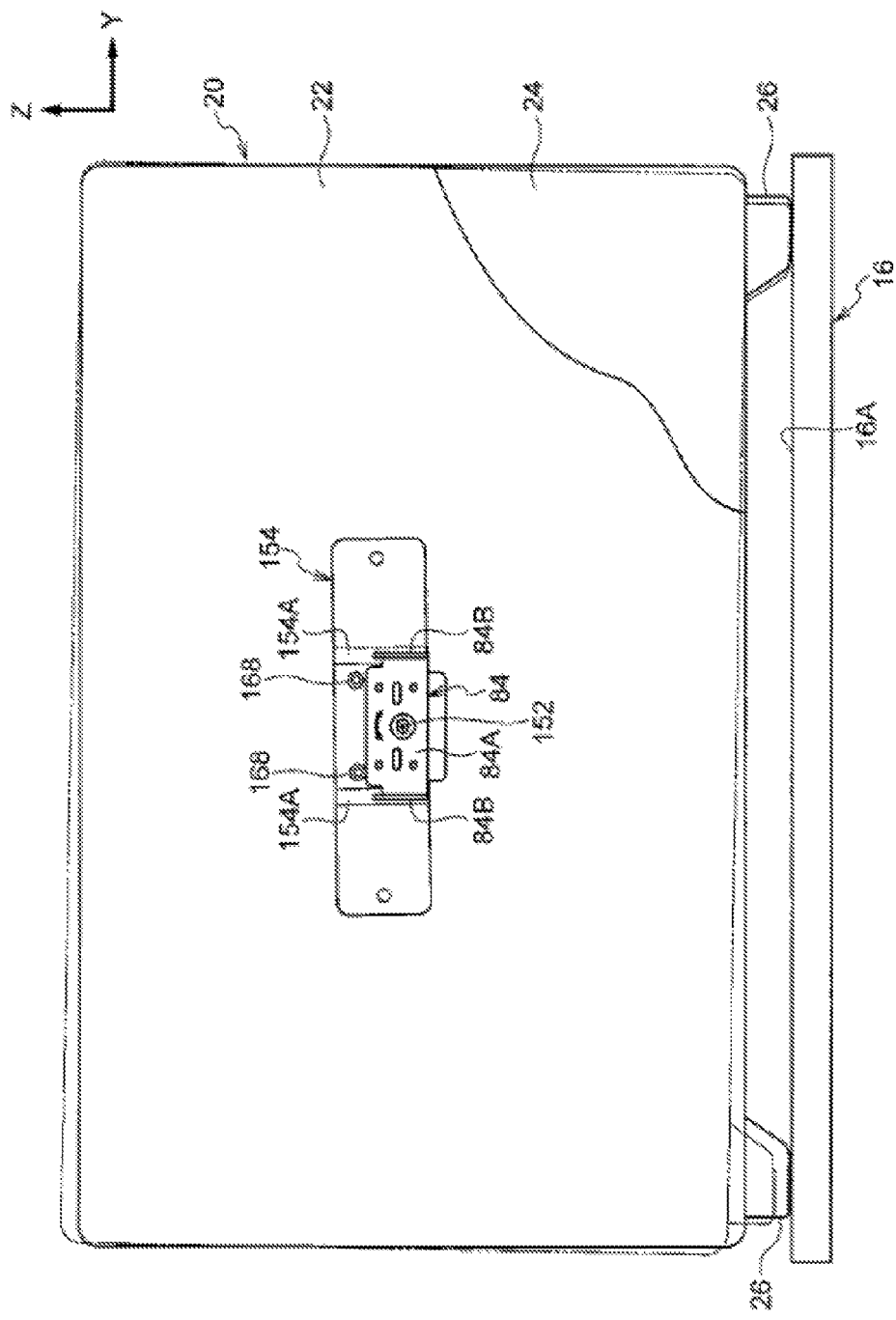
FIG. 19 is a rear view viewing a display illustrated in FIG. 1 from the rear side.

As illustrated by the two-dot chain line in FIG. 19, when the display 20 is inclined with respect to the installation surface 16A due to manufacturing errors of various components, an assembling error, or the like, the following concern arises. That is, among the pair of supports 26 that are provided at the lower end portion of the display 20, either one of the supports 26 (one on the left side in FIG. 19) may become lifted from the installation surface 16A.

On the other hand, in the present embodiment, the base plate 154 is supported by the outside bracket 84 of the upper hinge portion 80 in a pivotal manner about the pivot shaft 152. In other words, the display 20 is supported in a pivotal manner by the movable arm 32 (see FIG. 4) about a pivot shaft 152 that extends in the direction intersecting the display surface 22A.

Accordingly, even if the display 20 is inclined with respect to the installation surface 16A, both of the pair of supports 26 may be abutted against the installation surface 16A since the display 20 pivots with respect to the movable arm 32 about the pivot shaft 152. Accordingly, the stability of the display 20 may be improved.

Now, another way considered to avoid the supports 26 being lifted is to increase the manufacturing precision of the various components, increase the assembling accuracy, and the like. However, it takes cost to increase the manufacturing precision of the various components, to increase the assembling accuracy, and the like. Conversely, the present embodiment is capable of tolerating the manufacturing errors of the various components, the assembly error, and the like with a simple structure. Accordingly, cost may be reduced.

Furthermore, in the present embodiment, the pair of engagement portions 168 are provided in the base plate 154. By having either one of the pair of the engagement portions 168 abut against the outside bracket 84, the pivoting range of the display 20 with respect to the outside bracket 84 may be limited to a predetermined range.

Furthermore, the pivoting speed of the display 20 is reduced owing to the frictional force generated with the disk spring 164 in a portion where the fixed portion 84A of the outside bracket 84 and the washer 162 are in contact with each other. Accordingly, an impact or the like that is applied to the display 20 when the pair of supports 26 abut against the installation surface 16A upon pivoting of the display 20 may be alleviated. Accordingly, damage or the like to the display 20 may be suppressed. The present embodiment is particularly effective for a display 20 with a large screen. This is because the weight of a display 20 with a large screen is large and the pivoting speed of the display 20 tends to become fast.

Moreover, the base plate 154 is provided with the pair of convex portions 154A. By pressing the edge portions 84C of the outside bracket 84 against the pair of convex portions 154A with the restoring force of the disk spring 164, play or the like of the display 20 may be suppressed.

Modifications of the second embodiment described above will be described next.

In the second embodiment described above, an example in which the pair of engagement portions 168 are each formed in a cylindrical shape is described; however, the pair of engagement portions 168 are not limited to such a configuration. The shape and the arrangement of the pair of engagement portions 168 may be changed as appropriate. Furthermore, the pair of engagement portions 168 may be omitted as appropriate.

Furthermore, in the second embodiment described above, an example in which the disk spring 164 is used as the pivot restricting member is described; however, the pivot restriction member is not limited to the disk spring 164. A spring washer, for example, may be used as the pivot restriction member. Furthermore, the disk spring 164 may be omitted as appropriate.

Furthermore, in the second embodiment described above, an example in which the edge portions 84C of the outside bracket 84 are pressed against the pair of convex portions 154A of the base plate 154 is described; however, the configuration is not limited to the above. Other portions of the outside bracket 84 may be pressed against the pair of convex portions 154A. Furthermore, the pair of convex portions 154A may be omitted as appropriate.

While the first and second embodiments of the technique disclosed in the present application has been described above, the technique disclosed in the present application is not limited to the embodiments described above. Furthermore, the above-described first and second embodiments and various modifications may be appropriately combined. It goes without saying that the technique disclosed in the present application may be embodied in a variety of aspects without departing from the spirit and scope of the technique disclosed in the present application.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device, comprising:
an arm that pivots with respect to a body of the electronic device;
a device that pivots with respect to the arm; and
a link mechanism that includes a slider disposed along the arm which is disposed between the body and the device in a linear manner such that one end of the arm is coupled to the device and the other end of the arm is coupled to the body, the link mechanism moving the slider along the arm and in a longitudinal direction of the arm upon pivoting of the device such that the arm pivots in a direction opposite to a pivoting direction of the device.

2. The electronic device according to claim 1, further comprising:
a lower hinge portion that is fixed to the body, the lower hinge portion supporting a lower end side of the arm so as to allow the arm to tilt; and
an upper hinge portion that is provided on an upper end side of the arm, the upper hinge portion supporting the device in a pivotal manner between an upright position and a lying position, the upright position being a state in which the device is stood up and the lying position being a state in which the device is laid down, wherein
the link mechanism tilts the arm as the device moves towards the lying position from the upright position and stands the arm up as the device moves towards the upright position from the lying position.

3. The electronic device according to claim 2, wherein the upper hinge portion is provided with an upper elastic body that biases the device towards the lying position.

4. The electronic device according to claim 2, wherein the lower hinge portion is provided with a lower elastic body that biases the arm in a direction that stands the arm up.

5. The electronic device according to claim 2, wherein the lower hinge portion is provided with a lower pivot restriction member that restricts pivoting of the arm with a frictional force, and
the upper hinge portion is provided with an upper pivot restriction member that restricts pivoting of the device with a frictional force.

6. The electronic device according to claim 2, wherein the link mechanism includes
a first connecting link, one end of which is connected to the upper hinge portion in a rotatable manner and the other end of which is connected to the slider in a rotatable manner, the first connecting link moving the slider along the arm upon pivoting of the device, and
a second connecting link, one end of which is connected to the slider in a rotatable manner and the other end of which is connected to the lower hinge portion in a rotatable manner, the second connecting link pivoting in a direction opposite to a pivoting direction of the first connecting link upon movement of the slider such that the arm is pivoted in a direction opposite to a pivoting direction of the device.

7. The electronic device according to claim 2, wherein the lower hinge portion includes
a lower bracket that is attached to the body, and
a lower pivot shaft that supports the arm so as to allow the arm to tilt with respect to the lower bracket, and
the upper hinge portion includes
an upper bracket that is attached to a rear side of the device, and
an upper pivot shaft that extends in a direction the same as a direction in which the lower pivot shaft extends and that supports the upper bracket in a pivotal manner with respect to the arm.

8. The electronic device according to claim 7, wherein the link mechanism includes a fixing link that is fixed to the lower hinge portion,
one end of a first connecting link is connected to the upper bracket in a pivotal manner, and
one end of a second connecting link is connected to the fixing link in a pivotal manner.

9. The electronic device according to claim 2, wherein the link mechanism tilts the arm forward as the device is moved from the upright position towards the lying position such that the device is moved with respect to the body to a front side while a front surface is faced upwards, and the link mechanism stands the arm up towards a rear side as the device is moved from the lying position towards the upright position such that the device is moved upwards with respect to the body while the front surface is faced forward.

10. The electronic device according to claim 2, wherein the device is a display in which a front surface is a display surface and in which the display surface is faced forward when the display is in the upright position and the display surface is faced upwards when the display is in the lying position.

11. The electronic device according to claim 1, wherein the device is provided with a support that is supported by an installation surface on which the body is mounted.

12. The electronic device according to claim 1, wherein the device is supported by an upper end portion of the arm in a pivotal manner about a pivot shaft that extends in a direction that intersects a front surface of the device.

13. The electronic device according to claim 1, wherein a hole which extends in the longitudinal direction of the slider is provided at at least one of an upper portion and a lower portion of the slider.

14. The electronic device according to claim 13, wherein a guide pin is provided to the arm so as to be inserted to the hole.

15. An electronic device, comprising:

an arm that pivots with respect to a body of the electronic device;

a device that pivots with respect to the arm; and a link mechanism that includes a slider disposed along the arm which is disposed between the body and the device, the link mechanism moving the slider along the arm and in a longitudinal direction of the arm upon pivoting of the device such that the arm pivots in a direction opposite to a pivoting direction of the device, wherein the device is supported by an upper end portion of the arm in a pivotal manner about a pivot shaft that extends in a direction that intersects a front surface of the device.

16. An electronic device, comprising:

an arm that pivots with respect to a body of the electronic device;

a device that pivots with respect to the arm; and a link mechanism that includes a slider disposed along the arm which is disposed between the body and the device, the link mechanism moving the slider along the arm and in a longitudinal direction of the arm upon pivoting of the device such that the arm pivots in a direction opposite to a pivoting direction of the device, wherein a hole which extends in the longitudinal direction of the slider is provided at at least one of an upper portion and a lower portion of the slider, and a guide pin is provided to the arm so as to be inserted to the hole.

* * * * *